(12) United States Patent
Gokhale et al.

(10) Patent No.: US 11,099,944 B2
(45) Date of Patent: Aug. 24, 2021

(54) STORING METADATA AT A CLOUD-BASED DATA RECOVERY CENTER FOR DISASTER RECOVERY TESTING AND RECOVERY OF BACKUP DATA STORED REMOTELY FROM THE CLOUD-BASED DATA RECOVERY CENTER

(71) Applicant: Commvault Systems, Inc., Tinton Falls, NJ (US)

(72) Inventors: Parag Gokhale, Marlboro, NJ (US); Sanjay Harakhchand Kripalani, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 224 days.

(21) Appl. No.: 16/443,781

(22) Filed: Jun. 17, 2019

(65) Prior Publication Data
US 2019/0303246 A1    Oct. 3, 2019

Related U.S. Application Data

(63) Continuation of application No. 13/787,488, filed on Mar. 6, 2013, now Pat. No. 10,346,259.
(Continued)

(51) Int. Cl.
*G06F 11/14* (2006.01)
*G06F 11/26* (2006.01)

(52) U.S. Cl.
CPC ...... *G06F 11/1464* (2013.01); *G06F 11/1469* (2013.01); *G06F 11/26* (2013.01); *G06F 11/1458* (2013.01)

(58) Field of Classification Search
CPC .... G06F 21/604; G06F 21/62; G06F 21/6209; G06F 21/6218; G06F 21/6227;
(Continued)

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

| CN | 1259733 | 7/2000 |
| CN | 1525272 | 9/2004 |

(Continued)

OTHER PUBLICATIONS

Wikipedia's HTTP cookie historical version published Dec. 5, 2020 https://en.wikipedia.org/w/index.php?title=HTTP_cookie&oldid=992480213 (Year: 2020).*

(Continued)

*Primary Examiner* — Joseph O Schell
(74) *Attorney, Agent, or Firm* — Commvault Systems, Inc.

(57) ABSTRACT

A Remote Metadata Center provides Disaster Recovery (DR) testing and metadata backup services to multiple business organizations. Metadata associated with local data backups performed at business organizations is transmitted to the Remote Metadata Center. Corresponding backup data is stored in a data storage system that is either stored locally at the business organization or at a data storage facility that is at a different location than the Remote Metadata Center and the business organization. DR testing can be staged from the Remote Data Center using the metadata received and optionally with assistance from an operator at the business organization and/or the data storage facility.

20 Claims, 16 Drawing Sheets

Related U.S. Application Data

(60) Provisional application No. 61/746,714, filed on Dec. 28, 2012.

(58) Field of Classification Search
CPC .............. G06F 21/6245; G06F 21/6263; G06F 11/1458; G06F 11/1464; G06F 11/1469
See application file for complete search history.

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,123,107 A | 6/1992 | Mensch, Jr. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,590 B1 | 12/2001 | Chidlovskii et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,941,429 B1 | 9/2005 | Kamvyssells et al. |
| 6,959,327 B1 | 10/2005 | Vogl |
| 6,973,555 B2 | 12/2005 | Fujiwara |
| 7,000,238 B2 | 2/2006 | Nadler |
| 7,035,880 B1 | 4/2006 | Crescenti |
| 7,079,341 B2 | 7/2006 | Kistler et al. |
| 7,096,418 B1 | 8/2006 | Singhal |
| 7,107,298 B2 | 9/2006 | Prahlad |
| 7,130,272 B1 | 10/2006 | Gai et al. |
| 7,143,203 B1 | 11/2006 | Altmejd |
| 7,225,220 B2 | 5/2007 | Gonzalez et al. |
| 7,246,207 B2 | 7/2007 | Kottomtharayil |
| 7,260,633 B2 | 8/2007 | Lette |
| 7,334,144 B1 | 2/2008 | Schlumberger |
| 7,340,616 B2 | 3/2008 | Rothman et al. |
| 7,343,356 B2 | 3/2008 | Prahlad |
| 7,343,453 B2 | 3/2008 | Prahlad |
| 7,346,751 B2 | 3/2008 | Prahlad |
| 7,366,846 B2 | 4/2008 | Boyd et al. |
| 7,386,744 B2 | 6/2008 | Barr |
| 7,395,282 B1 | 7/2008 | Crescenti |
| 7,448,079 B2 | 11/2008 | Tremain |
| 7,472,079 B2 | 12/2008 | Fellenstein |
| 7,483,895 B2 | 1/2009 | Hysom |
| 7,502,820 B2 | 3/2009 | Manders |
| 7,516,346 B2 | 4/2009 | Pinheiro et al. |
| 7,516,348 B1 | 4/2009 | Ofer |
| 7,526,798 B2 | 4/2009 | Chao |
| 7,546,475 B2 | 6/2009 | Mayo et al. |
| 7,587,570 B2 | 9/2009 | Sarkar et al. |
| 7,617,191 B2 | 11/2009 | Wilbrink et al. |
| 7,627,827 B2 | 12/2009 | Taylor et al. |
| 7,631,351 B2 | 12/2009 | Erofeev |
| 7,651,593 B2 | 1/2010 | Prahlad |
| 7,653,668 B1 | 1/2010 | Shelat |
| 7,668,884 B2 | 2/2010 | Prahlad |
| 7,685,269 B1 | 3/2010 | Thrasher et al. |
| 7,694,070 B2 | 4/2010 | Mogi |
| 7,739,548 B2 | 6/2010 | Goodrum et al. |
| 7,761,736 B2 | 7/2010 | Nguyen et al. |
| 7,765,167 B2 | 7/2010 | Prahlad |
| 7,769,616 B2 | 8/2010 | Ollivier |
| 7,778,984 B2 | 8/2010 | Zhang |
| 7,792,789 B2 | 9/2010 | Prahlad |
| 7,797,453 B2 | 9/2010 | Meier et al. |
| 7,814,149 B1 | 10/2010 | Stringham |
| 7,814,351 B2 | 10/2010 | Redlich et al. |
| 7,818,082 B2 | 10/2010 | Roumeliotis et al. |
| 7,822,967 B2 | 10/2010 | Fung |
| 7,840,537 B2 | 11/2010 | Gokhale |
| 7,882,077 B2 | 2/2011 | Gokhale |
| 7,899,788 B2 | 3/2011 | Chadhok et al. |
| 7,917,438 B2 | 3/2011 | Kenedy et al. |
| 7,996,270 B2 | 8/2011 | Sundaresan |
| 8,001,277 B2 | 8/2011 | Mega |
| 8,037,028 B2 | 10/2011 | Prahlad |
| 8,065,166 B2 | 11/2011 | Maresh |
| 8,108,427 B2 | 1/2012 | Prahlad |
| 8,112,605 B2 | 2/2012 | Kavuri |
| 8,134,727 B1 | 3/2012 | Shmunis |
| 8,140,786 B2 | 3/2012 | Bunte |
| 8,219,524 B2 | 7/2012 | Gokhale |
| 8,266,406 B2 | 9/2012 | Kavuri |
| 8,285,681 B2 | 10/2012 | Prahlad |
| 8,296,534 B1 | 10/2012 | Gupta et al. |
| 8,307,177 B2 | 11/2012 | Prahlad |
| 8,316,091 B2 | 11/2012 | Hirvela et al. |
| 8,321,688 B2 | 11/2012 | Auradkar |
| 8,352,608 B1 | 1/2013 | Keagy et al. |

(56) References Cited

U.S. PATENT DOCUMENTS

| | | |
|---|---|---|
| 8,364,802 B1 | 1/2013 | Keagy et al. |
| 8,370,307 B2 | 2/2013 | Wolfe |
| 8,396,838 B2 | 3/2013 | Brockway et al. |
| 8,407,190 B2 | 3/2013 | Prahlad |
| 8,417,697 B2 | 4/2013 | Ghemawat et al. |
| 8,429,630 B2 | 4/2013 | Nickolov |
| 8,434,131 B2 | 4/2013 | Varadharajan et al. |
| 8,510,573 B2 | 8/2013 | Muller |
| 8,527,549 B2 | 9/2013 | Cidon |
| 8,566,362 B2 | 10/2013 | Mason et al. |
| 8,578,120 B2 | 11/2013 | Attarde et al. |
| 8,612,439 B2 | 12/2013 | Prahlad |
| 8,626,741 B2 | 1/2014 | Vijakumar et al. |
| 8,635,184 B2 | 1/2014 | Hsu et al. |
| 8,660,038 B1 | 2/2014 | Pascazio |
| 8,674,823 B1 | 3/2014 | Contrario et al. |
| 8,683,103 B2 | 3/2014 | Ripberger |
| 8,707,070 B2 | 4/2014 | Muller |
| 8,769,048 B2 | 7/2014 | Kottomtharayil |
| 8,780,400 B2 | 7/2014 | Shmunis |
| 8,799,242 B2 | 8/2014 | Leonard et al. |
| 8,849,761 B2 | 9/2014 | Prahlad |
| 8,849,955 B2 | 9/2014 | Prahlad |
| 8,924,511 B2 | 12/2014 | Brand |
| 8,950,009 B2 | 2/2015 | Vijayan et al. |
| 9,021,282 B2 | 4/2015 | Muller et al. |
| 9,021,307 B1 | 4/2015 | Parameswaran et al. |
| 9,195,636 B2 | 11/2015 | Smith |
| 9,454,537 B2 | 9/2016 | Prahlad et al. |
| 9,959,333 B2 | 5/2018 | Kumarasamy |
| 10,248,657 B2 | 4/2019 | Prahlad et al. |
| 10,264,074 B2 | 4/2019 | Vijayan et al. |
| 10,346,259 B2 | 7/2019 | Gokhale et al. |
| 10,379,598 B2 | 8/2019 | Muller |
| 2002/0035511 A1 | 3/2002 | Haji |
| 2002/0083079 A1 | 6/2002 | Meier et al. |
| 2002/0095609 A1 | 7/2002 | Tokunaga |
| 2002/0129047 A1 | 9/2002 | Cane et al. |
| 2002/0129106 A1 | 9/2002 | Gutfreund |
| 2002/0194033 A1 | 12/2002 | Huff |
| 2002/0194511 A1 | 12/2002 | Swoboda |
| 2003/0140068 A1 | 7/2003 | Yeung |
| 2003/0200222 A1 | 10/2003 | Feinberg |
| 2004/0210724 A1 | 10/2004 | Koning et al. |
| 2005/0076251 A1 | 4/2005 | Barr |
| 2005/0204097 A1 | 9/2005 | Kistler et al. |
| 2005/0268121 A1 | 12/2005 | Rothman et al. |
| 2005/0289414 A1 | 12/2005 | Adya |
| 2006/0058994 A1 | 3/2006 | Ravi |
| 2006/0101174 A1 | 5/2006 | Kanamaru |
| 2006/0107099 A1 | 5/2006 | Pinheiro et al. |
| 2006/0155633 A1 | 7/2006 | Fellenstein et al. |
| 2006/0161700 A1 | 7/2006 | Boyd et al. |
| 2006/0190775 A1 | 8/2006 | Aggarwal et al. |
| 2006/0206507 A1 | 9/2006 | Dahbour |
| 2006/0224846 A1 | 10/2006 | Amarendran |
| 2006/0236073 A1 | 10/2006 | Soules |
| 2006/0242356 A1 | 10/2006 | Mogi et al. |
| 2006/0245411 A1 | 11/2006 | Chen et al. |
| 2006/0251067 A1 | 11/2006 | Desanti |
| 2007/0043721 A1 | 2/2007 | Ghemawat et al. |
| 2007/0073970 A1 | 3/2007 | Yamazaki |
| 2007/0079156 A1 | 4/2007 | Fujimoto |
| 2007/0101173 A1 | 5/2007 | Fung |
| 2007/0168606 A1 | 7/2007 | Takai |
| 2007/0234302 A1 | 10/2007 | Suzuki |
| 2008/0005168 A1 | 1/2008 | Huff et al. |
| 2008/0010521 A1 | 1/2008 | Goodrum et al. |
| 2008/0082601 A1 | 4/2008 | Meiier et al. |
| 2008/0140244 A1 | 6/2008 | Roumeliotis et al. |
| 2008/0147460 A1 | 6/2008 | Ollivier |
| 2008/0162592 A1 | 7/2008 | Huang |
| 2008/0183891 A1 | 7/2008 | Ni |
| 2008/0228771 A1 | 9/2008 | Prahlad |
| 2008/0244032 A1 | 10/2008 | Gilson |
| 2008/0244177 A1 | 10/2008 | Crescenti |
| 2008/0256384 A1 | 10/2008 | Branson et al. |
| 2008/0270461 A1 | 10/2008 | Gordon |
| 2008/0301479 A1 | 12/2008 | Wood |
| 2008/0320319 A1 | 12/2008 | Muller et al. |
| 2009/0006877 A1 | 1/2009 | Lubbers et al. |
| 2009/0077443 A1 | 3/2009 | Nguyen et al. |
| 2009/0164853 A1* | 6/2009 | Gokhale ............ G06F 11/0709 714/57 |
| 2009/0198677 A1 | 8/2009 | Sheehy |
| 2009/0198825 A1 | 8/2009 | Miller |
| 2009/0210464 A1 | 8/2009 | Chiang-Lin |
| 2009/0254572 A1 | 10/2009 | Redlich et al. |
| 2009/0268903 A1 | 10/2009 | Bojinov et al. |
| 2009/0282020 A1 | 11/2009 | McSheffrey |
| 2009/0287665 A1 | 11/2009 | Prahlad |
| 2009/0319534 A1 | 12/2009 | Gokhale |
| 2009/0320029 A1 | 12/2009 | Kottomtharavil |
| 2009/0327477 A1 | 12/2009 | Madison, Jr. |
| 2010/0023722 A1 | 1/2010 | Tabbara |
| 2010/0064033 A1 | 3/2010 | Travostino |
| 2010/0070448 A1 | 3/2010 | Omoigui |
| 2010/0070466 A1 | 3/2010 | Prahlad |
| 2010/0070474 A1 | 3/2010 | Lad |
| 2010/0070725 A1 | 3/2010 | Prahlad |
| 2010/0082672 A1 | 4/2010 | Kottomtharayil |
| 2010/0082700 A1 | 4/2010 | Parab |
| 2010/0082713 A1 | 4/2010 | Frid-Nielsen et al. |
| 2010/0114833 A1* | 5/2010 | Mu .................... G06F 3/067 707/650 |
| 2010/0136943 A1 | 6/2010 | Hirvela et al. |
| 2010/0162002 A1 | 6/2010 | Dodgson et al. |
| 2010/0190478 A1 | 7/2010 | Brewer |
| 2010/0191774 A1 | 7/2010 | Mason, Jr. et al. |
| 2010/0235333 A1 | 9/2010 | Bates |
| 2010/0257403 A1 | 10/2010 | Virk et al. |
| 2010/0269164 A1 | 10/2010 | Sosnosky et al. |
| 2010/0274772 A1 | 10/2010 | Samuels |
| 2010/0299490 A1 | 11/2010 | Attarde et al. |
| 2010/0318782 A1 | 12/2010 | Auradkar et al. |
| 2010/0318812 A1 | 12/2010 | Auradkar et al. |
| 2010/0332401 A1 | 12/2010 | Prahlad |
| 2010/0332452 A1 | 12/2010 | Hsu et al. |
| 2010/0332479 A1 | 12/2010 | Prahlad et al. |
| 2010/0332818 A1 | 12/2010 | Prahlad et al. |
| 2010/0333116 A1 | 12/2010 | Prahlad |
| 2011/0022642 A1 | 1/2011 | DeMilo et al. |
| 2011/0040824 A1 | 2/2011 | Harm |
| 2011/0055161 A1 | 3/2011 | Wolfe |
| 2011/0093471 A1 | 4/2011 | Brockway et al. |
| 2011/0191544 A1 | 8/2011 | Naga et al. |
| 2011/0239013 A1 | 9/2011 | Muller |
| 2011/0276713 A1 | 11/2011 | Brand |
| 2011/0277027 A1 | 11/2011 | Hayton et al. |
| 2012/0054626 A1 | 3/2012 | Odenheimer |
| 2012/0110186 A1 | 5/2012 | Kapur et al. |
| 2012/0131645 A1 | 5/2012 | Harm |
| 2012/0240183 A1 | 9/2012 | Sinha |
| 2013/0007245 A1 | 1/2013 | Malik et al. |
| 2013/0024424 A1 | 1/2013 | Prahlad et al. |
| 2013/0035795 A1 | 2/2013 | Pfeiffer et al. |
| 2013/0125198 A1 | 5/2013 | Ferguson et al. |
| 2013/0238572 A1 | 9/2013 | Prahlad et al. |
| 2013/0238969 A1 | 9/2013 | Smith |
| 2013/0262385 A1 | 10/2013 | Vibhor et al. |
| 2013/0297902 A1 | 11/2013 | collins et al. |
| 2013/0326279 A1 | 12/2013 | Chavda et al. |
| 2014/0189432 A1 | 7/2014 | Gokhale et al. |
| 2014/0283010 A1 | 9/2014 | Rutkowski et al. |
| 2015/0113055 A1 | 4/2015 | Vijayan et al. |
| 2015/0127967 A1 | 5/2015 | Dutton |
| 2015/0198995 A1 | 7/2015 | Muller et al. |
| 2016/0100013 A1 | 4/2016 | Vijayan et al. |
| 2017/0039218 A1 | 2/2017 | Prahlad |
| 2017/0126807 A1 | 5/2017 | Vijayan et al. |
| 2018/0285383 A1 | 10/2018 | Nara |
| 2018/0375938 A1 | 12/2018 | Vijayan et al. |

(56) References Cited

U.S. PATENT DOCUMENTS

| | | | |
|---|---|---|---|
| 2019/0179805 A1 | 6/2019 | Prahlad et al. | |
| 2019/0182325 A1 | 6/2019 | Vijayan et al. | |
| 2019/0303246 A1 | 10/2019 | Gokhale et al. | |

FOREIGN PATENT DOCUMENTS

| | | |
|---|---|---|
| CN | 1936818 | 3/2007 |
| CN | 1968254 | 5/2007 |
| EP | 0259912 A1 | 3/1988 |
| EP | 0405926 A2 | 1/1991 |
| EP | 0467546 A2 | 1/1992 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

"Amazon Web Services@Amazon.com." http://web.archive.org/web/20080819144354/http://aws.amazon.com/s3, Aug. 19, 2008.
Anonymous: "Data Deduplication technology review," ComputerWeekly, Oct. 2008, pp. 1-6.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Chiappetta, Marco, "ESA Enthusiast System Architecture," <http://hothardware.com/Articles/NVIDIA_ESA_Enthusiast_System_Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," IEEE, Jun. 12-16, 1994, pp. 124-126.
Foster, et al., "Cloud Computing and Grid Computing 360-Degree Comparied," Grid Computing Environments Workshop, 2008.
Gait, J., "The Optical File Cabinet: A Random-Access File System for Write-Once Optical Disks," IEEE Computer, vol. 21, No. 6, pp. 11-22 (Jun. 1988).
International Search Report and Written Opinion for International Application No. PCT/US08/74686, dated Jun. 22, 2009, 13 pages.
International Search Report and Written Opinion for International Application No. PCT/US2010/040402, dated Feb. 24, 2011, 11 pages.
International Search Report and Written Opinion for PCT/US2011/054374, dated May 2, 2012, 9 pages.
Jander, M., "Launching Storage-Area Net," Data Communications, US, McGraw Hill, NY, vol. 27, No. 4 (Mar. 21, 1998), pp. 64-72.
Liu et al., "Semantic data de-duplication for archival storage system", IEEE 2008, 9 pages.
Mell et al., "The NIST Definition of Cloud Computing," NIST Special Publication, 2011.
Microsoft Corporation, "How NTFS Works," Windows Server TechCenter, updated Mar. 28, 2003, internet accessed Mar. 26, 2008, 26 pages.
Parlante, Nick; Linked List Basics; 2001, pp. 1-26.
Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversusspllit.html>, internet accessed on Jul. 14, 2008, 2 pages.
Strickland, J., "How Cloud Storage Works," Apr. 30, 2008, pp. 1-6, retrieved from the inter: http://computer.howstuffworks.com/cloud-computing/cloud-storage.htm/printable.
VMware, Inc., "Open Virtual Machine Format," <http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.

(56) References Cited

OTHER PUBLICATIONS

VMware, Inc., "VMware Workstation 5.0, Snapshots in a Linear Process," <http://www.vmware.com/support/ws5/doc/ws_preserve_sshot_linear.html>, internet accessed on Mar. 25, 2008, 1 page.

VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.

VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.

Wang et al. "Performance analysis of data deduplication technology for storage", Proc. Of SPIE vol. 7517, 2007, 7 pages.

Wikipedia, "Cloud computing," <http://en.wikipedia.org/wiki/Cloud_computing>, internet accessed Jul. 8, 2009, 13 pages.

Wikipedia, "Cluster (file system)," <http://en.wikipedia.org/wiki/Cluster_%28file_system%29>, internet accessed Jul. 25, 2008, 1 page.

Wikipedia, "Cylinder-head-sector," <http://en.wikipedia.org/wiki/Cylinder-head-sector>, internet accessed Jul. 22, 2008, 6 pages.

Wikipedia, "File Allocation Table," <http://en.wikipedia.org/wiki/File_Allocation_Table>, internet accessed on Jul. 25, 2008, 19 pages.

Wikipedia, "Logical Disk Manager," <http://en.wikipedia.org/wiki/Logical_Disk_Manager>, internet accessed Mar. 26, 2008, 3 pages.

Wikipedia, "Logical Volume Management," <http://en.wikipedia.org/wiki/Logical_volume_management>, internet accessed on Mar. 26, 2008, 5 pages.

Wikipedia, "Storage Area Network," <http://en.wikipedia.org/wiki/Storage_area_network>, internet accessed on Oct. 24, 2008, 5 pages.

Wikipedia, "Virtualization," <http://en.wikipedia.org/wiki/Virtualization>, internet accessed Mar. 18, 2008, 7 pages.

Reingold, B. et al., "Cloud Computing: Industry and Government Developments (Part II)," LegalWorks, 2009, 5 pages.

Reingold, B. et al., "Cloud Computing: The Intersection of Massive Scalability, Data Security and Privacy (Part I)," LegalWorks, 2009, 5 pages.

Reingold, B. et al., "Cloud Computing: Whose Law Governs the Cloud? (Part III)," LegalWorks, 2010, 6 pages.

\* cited by examiner

STORING METADATA AT A CLOUD-BASED DATA RECOVERY CENTER FOR DISASTER RECOVERY TESTING AND RECOVERY OF BACKUP DATA STORED REMOTELY FROM THE CLOUD-BASED DATA RECOVERY CENTER

CROSS-REFERENCE TO RELATED APPLICATION(S)

This application is a continuation of U.S. application Ser. No. 13/787,488, filed Mar. 6, 2013, which claims priority to and the benefit of U.S. Provisional Application No. 61/746,714, filed Dec. 28, 2012, which are hereby incorporated herein by reference in their entireties.

BACKGROUND

Computer systems contain large amounts of information. This information includes personal information, such as financial information, customer/client/patient contact information, business information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, and then create one or more secondary copies, such as backup files, containing the contents of the file. These secondary copies can then later be used to restore the original data should anything happen to the original data.

In the recent years, business organizations have seen an explosive growth in the number of computing platforms that operate within the organization's work facilities. Large volumes of data are routinely generated, stored and retrieved from storage devices. Often, the data includes critical information, without which, the operation of a business organization may suffer. In spite of the criticality of data to the operation, businesses often do not have the resources or the expertise to manage data, including operations such as regular backups and data recovery.

DETAILED DESCRIPTION

Figure 1:
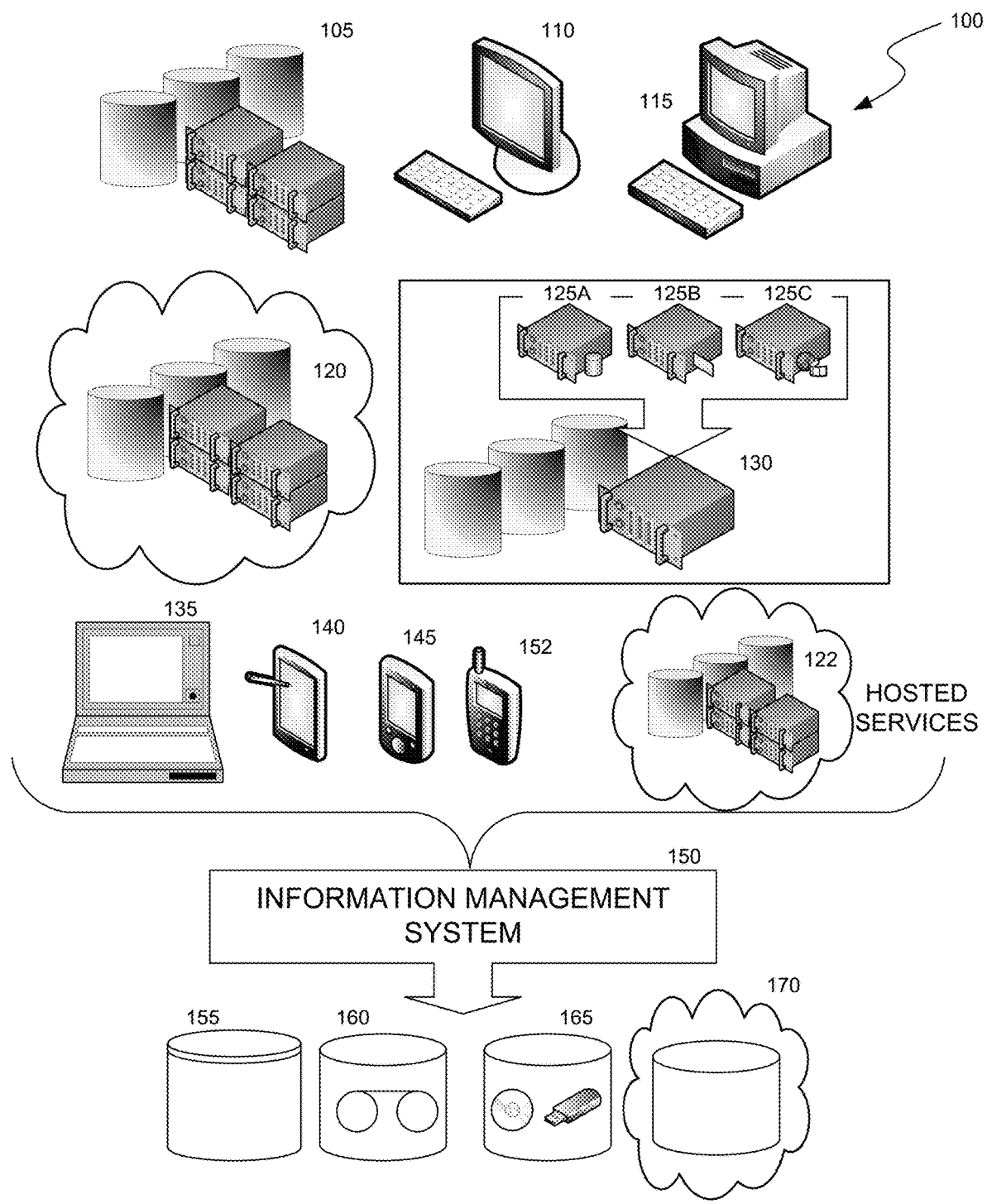
FIG. 1 is a block diagram illustrating an example of a suitable information management environment in which aspects of the inventive systems and methods may operate.

Management of a data backup system is often a complex process that requires the administrator to have the requisite training and experience to successfully execute data backups and, equally importantly, be able to restore data when needed. Some business organizations often have Information Technology (IT) departments that may take care of data backup/restoration tasks. However, not all businesses have the resources or trained personnel to manage data backup and restoration operations. Furthermore, even when a business has the requisite resources, data recovery is often a complex and time consuming operation that takes valuable time away from the IT personnel. Furthermore, in some instances, when a business is transitioning from one vendor's data backup technology to another vendor's data management solution, during the transition time in which the IT department is going through training and learning curve, the business may not have the requisite skill set to manage data backups and data recovery.

In large data storage systems, data backup operations are typically controlled by a management server (e.g., below described management server 402) that stores "metadata" pertaining to backup operations. The metadata is usually significantly smaller in volume than the actual data backed up (for example, backing up 100 Gbytes of corporate data may generate metadata that is 200 to 300 Mbytes). However, in some implementations, a business organization may not have a dedicated server running for data backup/storage operations. Even when a dedicated server is running, it may still take time to prepare the server for restoring specific data files. In case of emergencies (e.g., a natural disaster), or simply when running disaster recovery testing, there may not be sufficient time to configure server for data recovery. In addition, businesses often use off-site data warehouses and storage facilities to store tapes and disks containing backed up data. Trained personnel and hardware platforms that run the storage manager are typically not available at the off-site data storage facilities and running DR testing at these facilities can be an expensive and time consuming operation.

Techniques for providing disaster recovery (DR) services to a business organization or a customer premises are described in detail below. An organization's backup data ("non-production copies", as described more generally below), is separated into the actual backed up data portion and the corresponding metadata portion. As further described below, the metadata does not include actual content of user-generated files, but is limited to pointers, look up tables or other data structures that are useful in restoration of the backed up data to a user machine.

Typically, the size of metadata is substantially smaller (e.g., one-hundredth) the size of the backup data. The backed up data is stored using bulk storage hardware such as disk arrays, optical drives, tape drives, etc. at the production data facility or at an off-site data storage center. The metadata, however, is stored at a remote location. Accompanying the metadata, an "always available" controller (e.g., the below described storage manager 402) is made available at the remote site. The metadata may be continuously fed into the remote site when backups are performed at the business organization, with the corresponding backed up data sent to the data storage center. When the business organization desires to recover backed up data or desires to perform Disaster Recovery (DR) testing, it may activate the controller at the remote metadata storage site. The controller may then perform data restoration or DR testing in coordination with the business organization's local operator machines and the data storage center (which may be at the same location as the business organization, or at another location).

In some disclosed embodiments, a metadata center may be located at a location that is geographically remote to a business organization. The metadata center may be managed and operated by a service provider that is different from the business and may provide storage and date recovery services to multiple businesses. Routine data backups may be performed at each business facility, e.g., using bulk storage devices such as network attached storage (NAS) or tape drives and the corresponding metadata that includes pointers, tables and other information for restoration of the backed up data may be communicated to the remote metadata center. Each served business organization may have its own on-site or off-site data storage center. The metadata may physically reside at the metadata center but may be available for data recovery or DR testing from a local operator console or from a remote operator console at the metadata center.

In some configurations, the metadata center is "remote" from the production data site in the sense of geographical separation, e.g., located in another city or another state. In some embodiments, the metadata center is remote in the sense of occupying a different Internet Protocol (IP) address. In some configurations, remoteness may imply the operability of the metadata center under control of a business entity that is independent of the production data business. While there may be a client-service provider relationship, the system management, power supply, network configuration, etc. may be independent for the production data sites served by the metadata center.

In one aspect, a method, an apparatus and a system for providing a cloud-based backup storage service to a production data facility are disclosed. A cloud storage manager is configured at the cloud-based backup storage facility to communicatively couple to a local storage manager at the production data facility. The computer network includes the local storage manager but not the cloud storage manager. For example, in some embodiments, the local storage manager can communicate with other computers attached to the computer network without having the communication go through a gateway server or a firewall. The local storage manager is configured to control a backup operation of data in the computer network and communicate storage metadata generated during the backup operation to the cloud storage manager. The storage metadata is received at the cloud storage manager without receiving actual data backed up during the backup operation. The received storage metadata is processed to generate usage information and is stored at a cloud metadata storage system.

The various techniques and embodiments disclosed herein provide solutions for the above-discussed and other operational challenges in data storage management. In one example aspect, a metadata storage service is provided in the cloud. The metadata storage service may be managed by a service provider that is a separate commercial entity from the client business organizations serviced by the metadata storage service. In another aspect, the cloud based service may be configured to store and play back metadata associated with data backups performed at the business organization. In this way, while an external entity is providing backup services, the external entity only receives and processes metadata, and not user data itself, a company's data still remains in control of the company, thereby preserving confidentiality. The metadata, while useful for restoring backed up data into usable data files, does not typically contain actual user data and therefore does not typically contain any confidential information of an organization. The metadata storage service provider may also provide service to perform disaster recovery (DR) of data or simply DR testing and therefore is also alternatively referred to as being a "DR service provider" in this document.

As further described below, a service level agreement (SLA) may exist between a business organization and a DR service provider. The SLA may specify frequency of data backups, DR testing, volume of data backup or metadata supported etc. The DR service provider may use cloud-based facilities such as data mirroring to ensure a level of availability (e.g., 99.999% service availability time). The DR service provider may also facilitate data storage and recovery at geographically distributed sites of the business organization. The DR service provider may generate alerts and may incrementally bill the business organization, based on whether actual run time service exceeds capacity agreed upon in the SLA.

As further described below, a local operator console may be made available at the business organization. Using the local operator console, IT personnel of the business organization may be able to monitor or control the operation of the remote data center, with respect to the service provided to the service organization. A remote data center operator console may be provided at the remote metadata center. The service provider may be able to control the service provided to a business organization using the remote data center operator console.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010-0332456, which is hereby incorporated by reference herein in its entirety.

Figure 2:
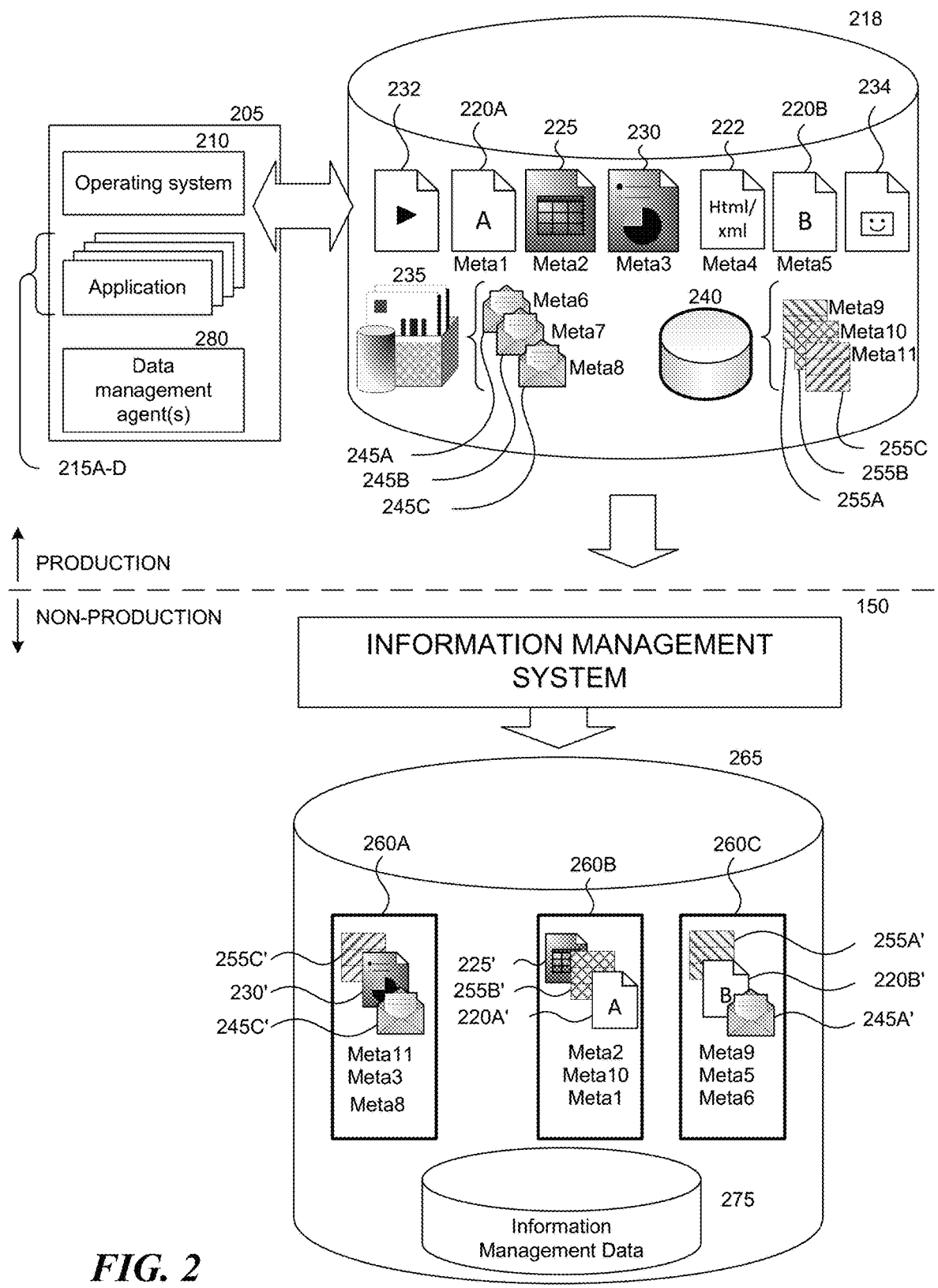
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments.

As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified.

Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
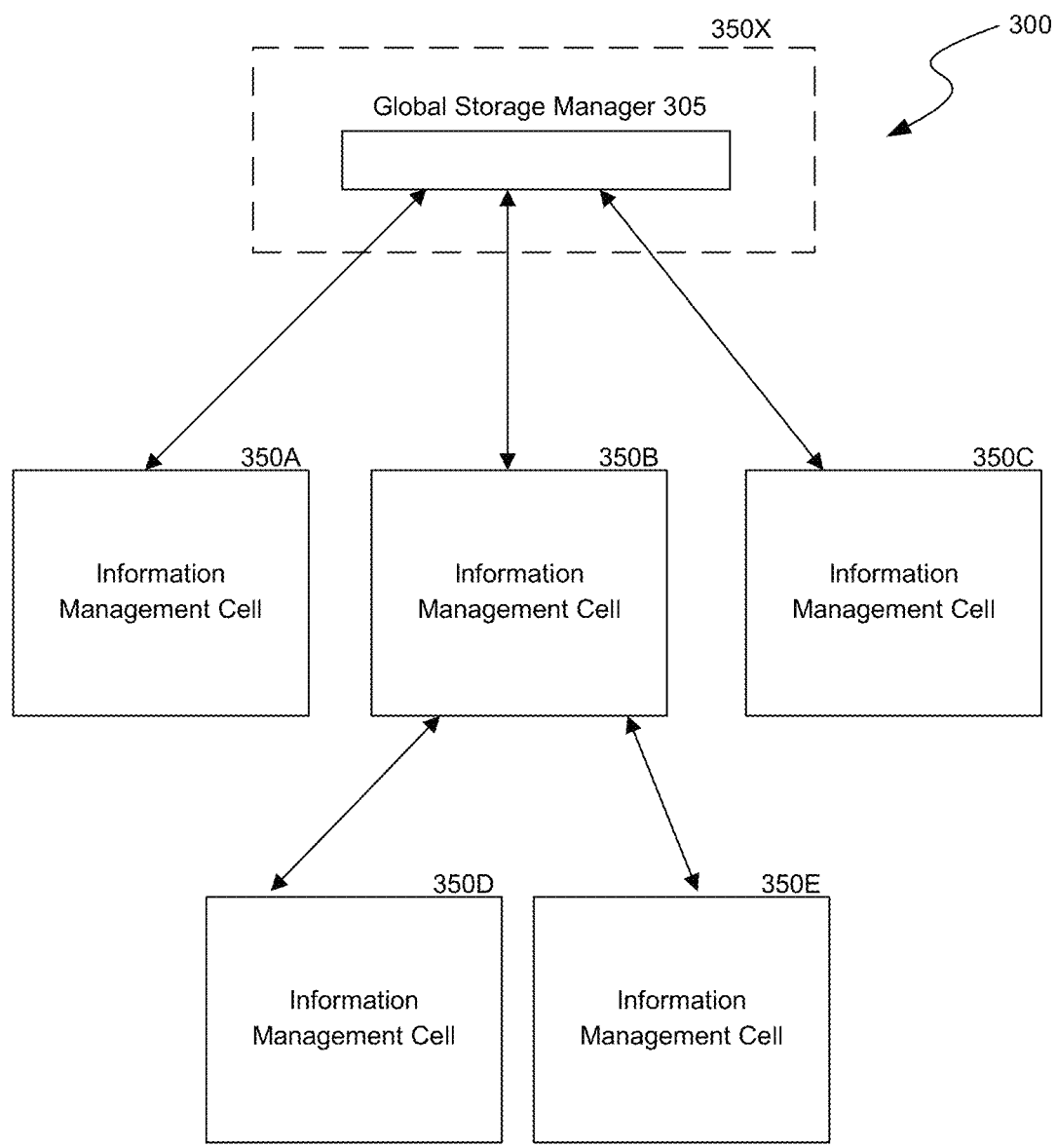
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
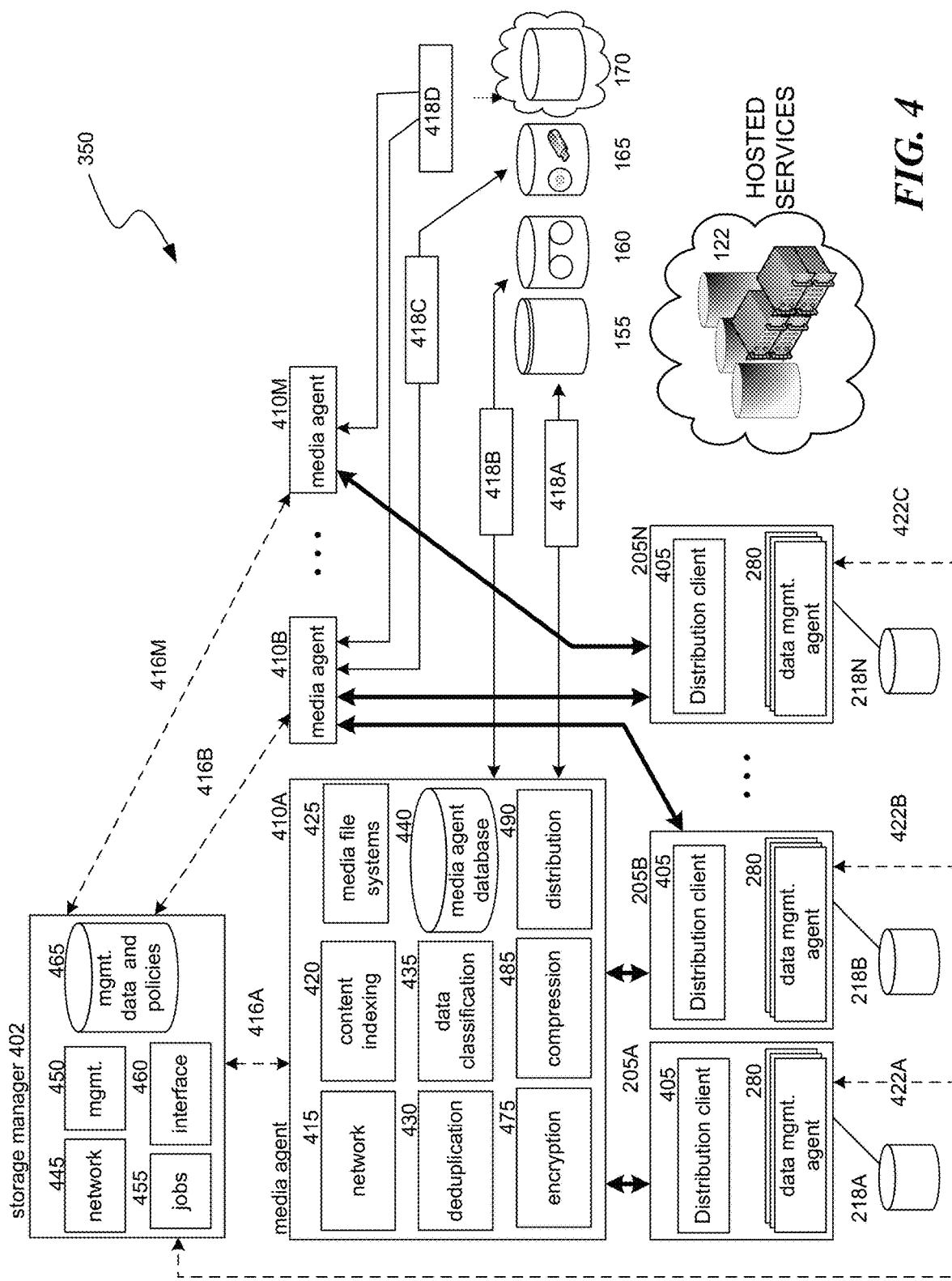
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-70, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced more fully and incorporated by reference above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each includes a set of criteria and rules associated with performing an information management operation. The criteria may be used to determine which rules apply to a particular data object, system component, or information management operation, an may include:

frequency with which a production or non-production copy of a data object or metadata has been or is predicted to be used, accessed, or modified;

access control lists or other security information;

the sensitivity (e.g., confidentiality) of a data object as determined by its content and/or metadata;

time-related factors;

deduplication information;

the computing device, hosted service, computing process, or user that created, modified, or accessed a production copy of a data object; and an estimated or historic usage or cost associated with different components.

The rules may specify, among other things:

a schedule for performing information management operations, a location (or a class or quality of storage media) for storing a non-production copy, preferences regarding the encryption, compression, or deduplication of a non-production copy, resource allocation between different computing devices or other system components (e.g., bandwidth, storage capacity), whether and how to synchronize or otherwise distribute files or other data objects across multiple computing devices or hosted services, network pathways and components to utilize (e.g., to transfer data) during an information management operation, and retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-70. Each media agent 410 may control one or more intermediary storage devices 418, such as a cloud server or a tape or magnetic disk library management system, to read, write, or otherwise manipulate data stored in a non-production storage medium 155-70. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other.

Suitable Systems

Figure 5:
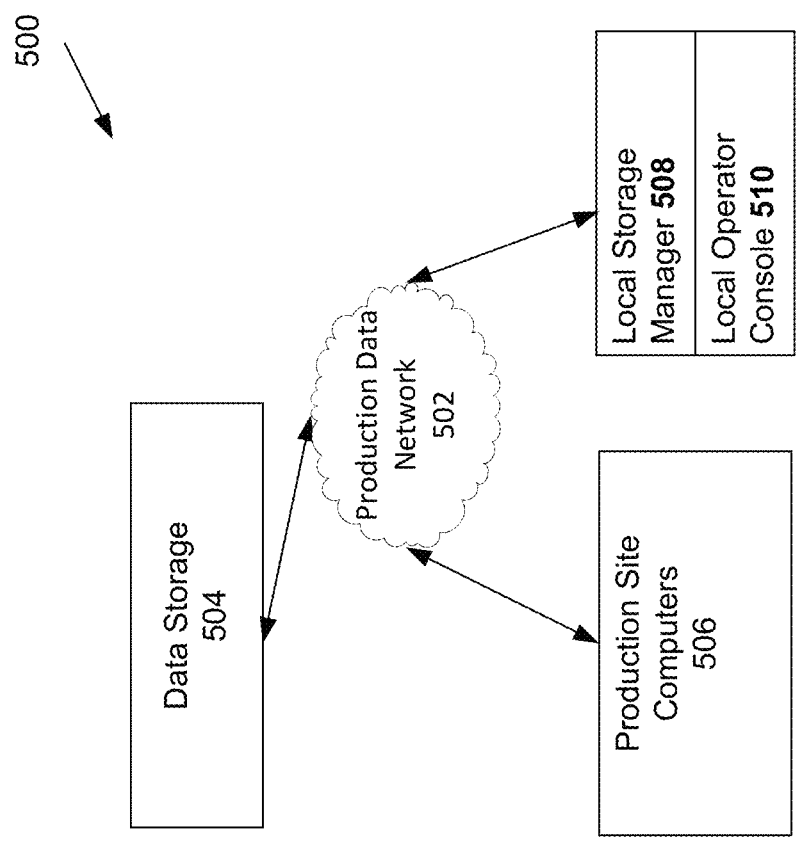
FIG. 5 is a block diagram illustrating a locally managed data backup system.

FIG. 5 is a block diagram illustrating a computer data backup and restoration system 500. The system 500 may, e.g., be deployed by a business facility and be within the business organization's control and located on-site (with possible exception of the data storage 504, as further discussed below). In some implementations, the data backup and storage operations are managed locally. A production data network 502 communicatively couples data storage 504 that is present locally with production site computers 506 and a local storage manager 508 that may have a local operator console (or user interface) 510. The data storage 504 may be used to store copied or backup data. When data is lost due to hardware crash or other computer related failures in one of the production site computers 506, the backed up data from the data storage 504 may be recovered and re-installed to replace the lost data.

In some implementations, the data storage 504 represents storage resources at a storage facility that is geographically remote from the production data site. The physical separation, in one aspect, provides improved disaster recovery for retrieving data from the storage facility in case of a disaster at the production site. Copies of data on media, often called "backup media" such as tapes and optical drives, along with media readers, computer servers, uninterrupted power supply (UPS), etc. are typically provided at the data storage 504 facility.

As previously discussed one operational inconvenience of the system 500 may be that operations such as data recovery or DR testing require the availability of trained personnel and hardware platforms at the production data facility and at the data storage facility 504. For example, to perform DR testing, an operator may need to bring up a storage manager at the data storage facility 504, read back the metadata and populate directories with files by loading tapes or disks as needed. This process may take a significant amount of time (e.g., 4 to 6 hours) and also need trained operators to travel to the data storage location for performing DR testing or data recovery. Alternatively, tapes and disks may have to be shipped from the data storage facility 504 to the production data site to perform DR testing or data recovery.

The inventors have recognized that there is a need in the data storage industry to reduce the above-discussed and other complexity and inefficiency associated with the DR testing and data recovery technologies. The system described herein provides several techniques to overcome these, and other, operational limitations.

Figure 6A:
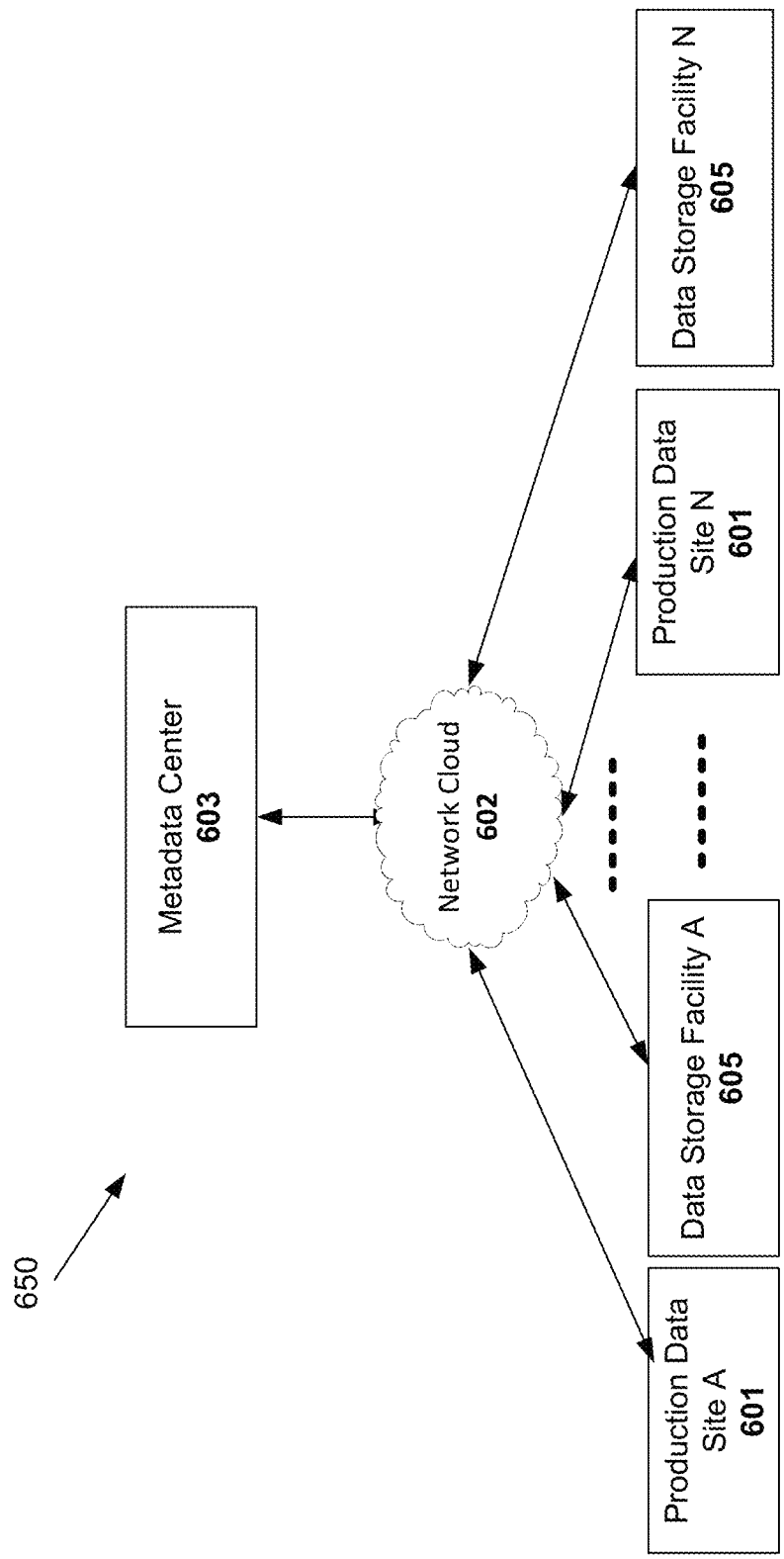
FIG. 6A is a block diagram illustrating a system for data backup and recovery in the cloud.

FIG. 6A is a block diagram representation of a system 650 that includes a metadata center 603 remotely located from, and accessible to, one or more production data sites 601 and corresponding one or more data storage facilities 605, over a network cloud 602. As previously discussed, the data storage facilities 605 may be located at the associated production data site 601 or may be an off-site location. For example, Production Data Site A and Data Storage Facility A may be co-located, while Production Data Site N and Data Storage Facility N (N is a positive integer) might be located at different places.

As further discussed below, the metadata center 603 may be operated by a service provider providing data recovery and DR testing services to multiple costumers at production data sites A through N. The service provider may take on the responsibility of managing each customer's metadata that it may receive over the network cloud 602, build restoration tables based on the received metadata and ensure that a service manager is continuously available (or available at a short notice) to the customers for performing data recovery or DR testing.

Figure 6B:
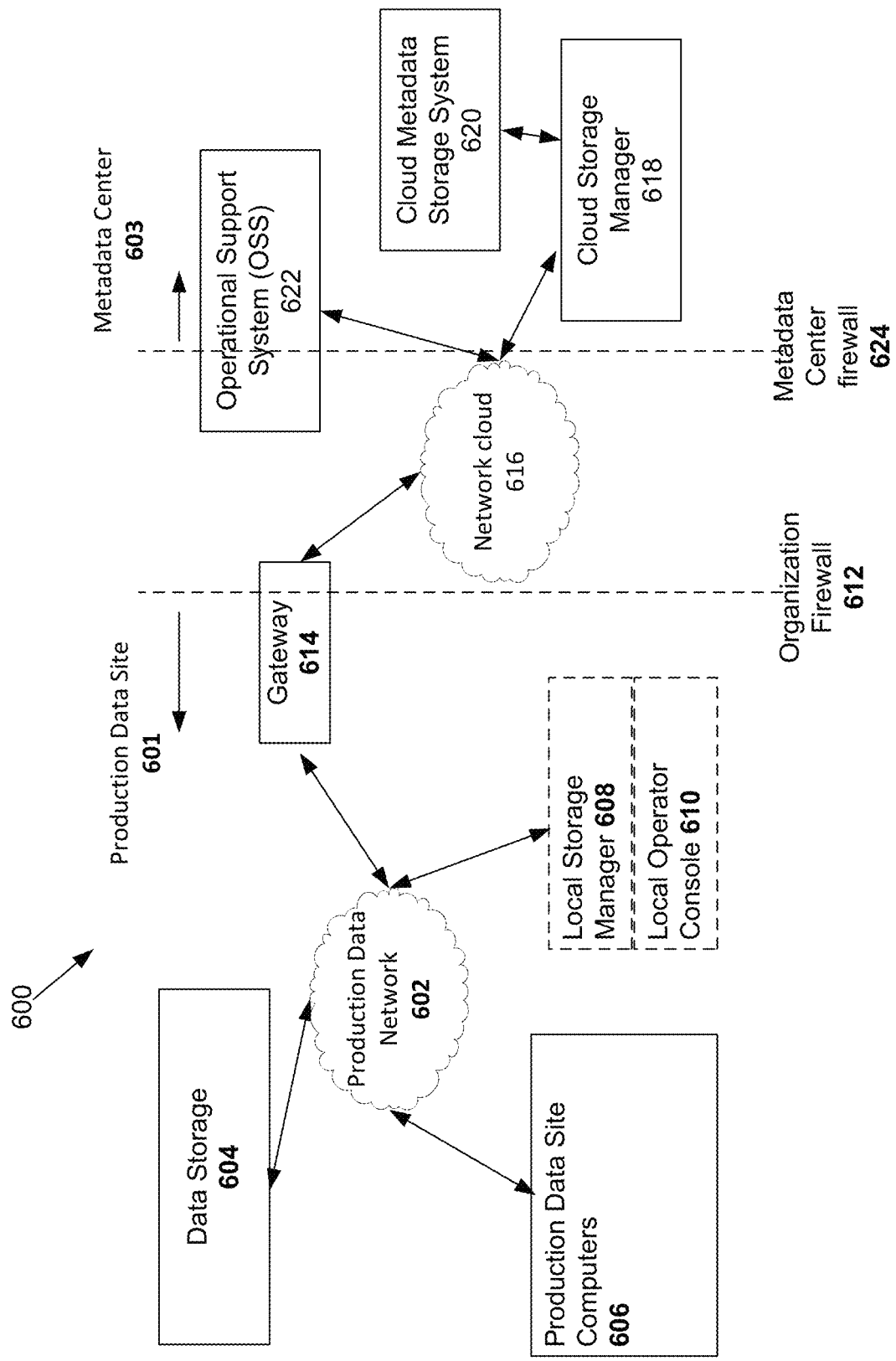
FIG. 6B is a block diagram illustrating a system for data backup and recovery in the cloud for a business having an on-site data storage facility.
Figure 6C:
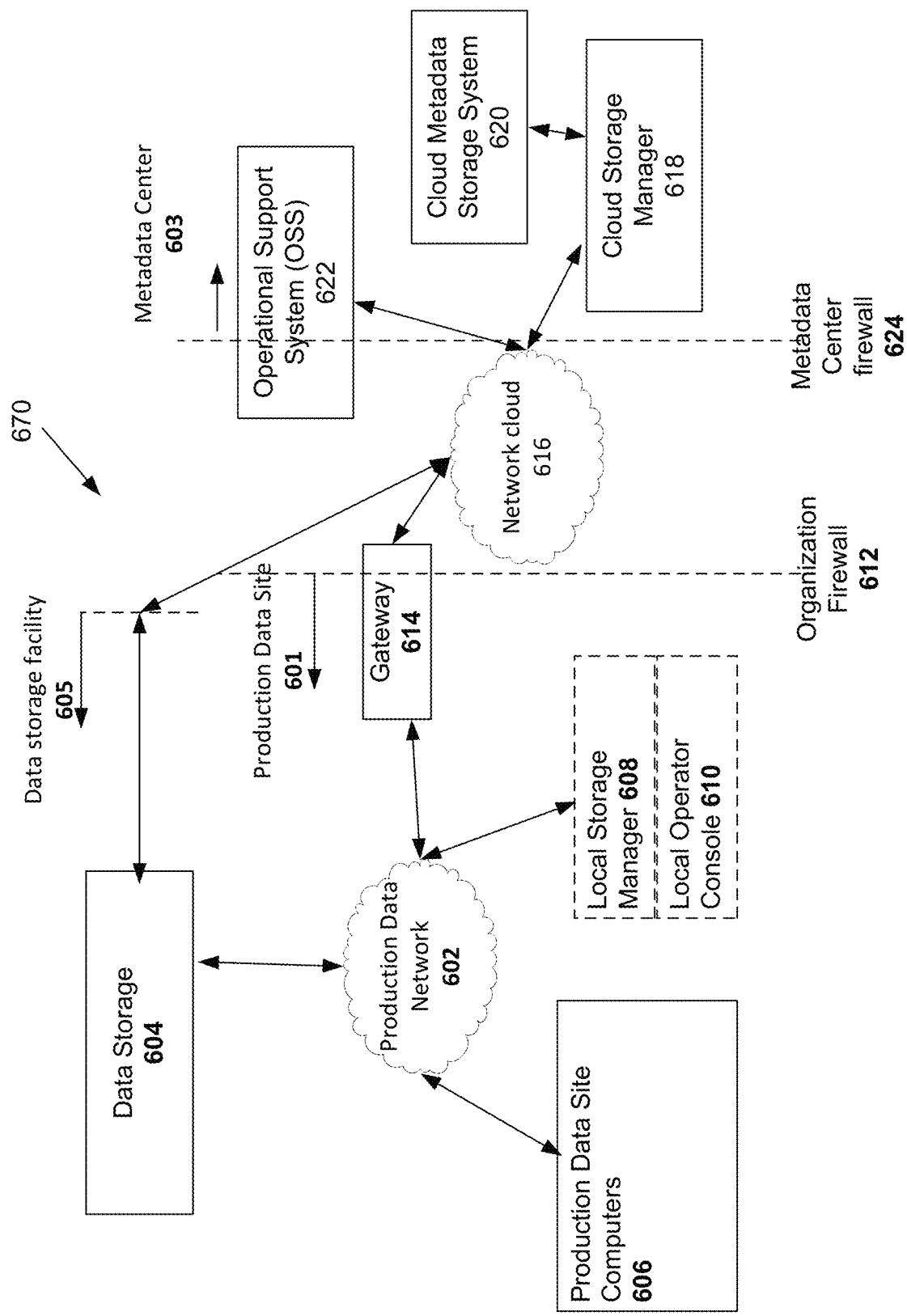
FIG. 6C is a block diagram illustrating a system for data backup and recovery in the cloud for a business having an off-site data storage facility.

With reference to FIGS. 6B and 6C, two alternate configurations are discussed. In FIG. 6B, the data storage facility 605 is co-located with the production data site computers, while in FIG. 6C, the data storage facility 605 is not co-located with the production data site computers.

FIG. 6B is a block diagram illustrating a system 600 for data backup and recovery in the cloud. The system 600 may include production site 601 functional modules and metadata center 603 functional modules, communicatively coupled with each other via a network cloud 616. The network cloud may represent, e.g., the Internet, a corporate data communication network and may span across different communication technologies (e.g., Gigabit Ethernet, wireless, etc.). At the production site 601, a gateway 614 (to be described in greater detail later) may control the flow of data back and forth between the production site 601 and the metadata center 603.

The metadata center 603 includes a cloud storage manager 618, in communication with a cloud metadata storage system 620 and an operational support system (OSS) 622. In some implementations, a metadata center firewall 624 may provide security and filtering functions for data traffic between the metadata center 603 and the network cloud 616. Further operational features of the cloud storage manager 618, the cloud metadata storage system 620 and the OSS 622 are provided below.

In some implementations, the metadata center 603 is located at a location remote from the production site 601. For example, the metadata center 603 may be located in a different city, a different state or a different country. One advantageous aspect of the geographic remoteness being that in case of a data emergency such as power failure at the production site, or a natural disaster at the production site (flood, earthquake, hurricane, etc.) the metadata center 603 may not suffer from such a data emergency and could be used for data recovery. Advantageously, because the amount of metadata that gets transmitted over the network cloud 616 is a relatively small fraction of the actual data that is backed up at the production site 601 (e.g., one-hundredth or one-thousandth the actual data), the remoteness of the metadata center 603 does not pose a problem with respect to availability of sufficient bandwidth for the data connection between the metadata center 603 and the production site 601.

In some implementations, the metadata center 603 is managed by a provider of cloud-based DR service. The DR service provider may be a different entity from the entity that owns or operates the production site 601. As previously discussed, organizations that use multiple computers and servers do not always have the money, resources and/or skills to manage and operate data backup and DR services and may outsource the operation of metadata center 603 to a DR service provider. Therefore, regardless of the geographic separation between the metadata center 603 and the production data site 601 are, due to the business arrangement, all functional modules at the metadata center 603 and the computers and data storage subsystems at the production data site 601 may be communicatively isolated from each other (e.g., different wired or wireless Internet networks, using different IP address ranges, being served by different internet service providers, being managed by different system administrators, etc.). Data communication between the production site 601 and the metadata center 603 may be limited strictly only to authorized metadata and control data traffic, as described in this document. These data traffic rules may further be implemented by the organization firewall 612 and the metadata center firewall 624. During operation, secure communication may be provided using a technology such as "virtual private network" which temporarily assigns an Internet Protocol address so that a computer from the production data network 602 is accessible through the VPN connection to a computer from the metadata center 603 (and vice versa); alternatively or additionally the accessible computer also has a second IP address that is different from its VPN IP address.

In some implementations, the cloud storage manager 618 is configured to be controlled from a local console at the production data site 601 or a remote console (not shown in FIG. 6B) at the metadata center 603. In some implementations, the control may be exclusively from one console or the other. For example, the service agreement between a business and the service provider may specify who controls the operation. In some implementations, the control may be partly from the local console and partly from the metadata center console. Further details on cloud storage management may be found in the assignee's U.S. Pat. No. 8,285,681, entitled DATA OBJECT STORE AND SERVER FOR A CLOUD STORAGE ENVIRONMENT, INCLUDING DATA DEDUPLICATION AND DATA MANAGEMENT ACROSS MULTIPLE COULD STORAGE SITES.

As previously discussed, metadata from different organizations that do not share data with each other can still be stored under the control of the same storage manager 618 with no data contamination issues because the actual data is not present at the metadata center. The cloud storage manager may store each business's metadata in a secure container that is logically isolated from other customer's metadata when stored on the cloud metadata storage system 620. The security and isolation may be achieved using one of several techniques such as encryption, authentication using username/password, mapping to different sectors on the storage device, use of different physical storage devices or storage medium, encryption based, and so on.

In various implementations, the local operator console 610 may be used for controlling or monitoring ongoing data backup, restoration and DR testing operations. For example, in one mode, an operator could use the local operator console 610 to "sign up" to the metadata storage and DR testing services offered by the service operator by logging onto a computer at the metadata center 603 (e.g., using a secure web page). In another mode of operation, the local operator console 610 may activate the metadata center 603 so that the center starts receiving metadata generated during a backup operation at the production data site 601. The local operator console 610 may also direct the metadata center 603 to stop monitoring of metadata for the production data being backed up. Other possible ways of activation/deactivation from the production data site to the metadata center could be e-mail, phone call, secure web access, etc. Note that while the term "backup" is generally used, it refers to any type of data copies, i.e., any non-production copy.

In another operational mode, the local operator console 610 may be used to simply monitor the progress of an ongoing data recovery or DR testing operation at the metadata center 603. Visual cues or disabled GUI control features may be used to indicate to a local operator that the local operator console 610 is operating in this "monitoring only" mode. Alternatively or additionally, the local operator console 610 may receive DR reports during or after a DR test/event to help an operator understand the successes and failures of the test/event.

In another operational mode, the local operator console 610 may be able to control the data recovery or DR testing occurring at the metadata center 603. In some embodiments, this "control mode" of operation may be achieved by effectively providing a "virtual desktop" or a remote login to the local operator via the local operator console onto the cloud storage manager 616. In the control mode, the local operator at the production data site 601 may be able to fully control the operation of DR testing or data recovery, as if the operator were at the metadata center 603.

FIG. 6C depicts a configuration 670 in which the data storage 604 is located at a data storage facility 605 that is remote from the production data site 601. In some implementations, communication between the data storage 604 and the metadata center 603 may go through a firewall or a network link that is different from the previously discussed organization firewall 612. For example, because the data storage facility 605 may not be within physical reach of a local operator at the production data site 601, when performing DR testing in the configuration 670, the cloud storage manager 618 may direct message related to loading/unloading of backup tapes to the data storage 604, instead of directing these messages to the local operator console 610.

The configurations depicted in FIGS. 6A, 6B and 6C can be used to improve present day DR testing, which can be expensive and cumbersome. For example, in a present day installation, an operator may have to go through an elaborate set up to bring up a storage manager at the production data site 601, before DR testing can be performed. By contrast, in the configuration, e.g., as depicted in FIG. 6A, the complex task of maintaining a storage manager in "warm" (i.e., made available in few minutes—e.g., less than 5 or 10 minutes) or a "hot" (always available) mode is simplified, thereby making DR testing a relatively straightforward task from the viewpoint of a local operator at the production site 601.

For example, in configurations such as depicted in FIG. 6B, where data storage 604 is within immediate physical reach of a local operator at the production data site 601, a local operator can request DR testing and simply load backup tapes or drives as prompted by the cloud storage manager 618 over the local operator console 610 while the cloud storage manager 618 runs the DR testing.

In another example, in configurations such as depicted in FIG. 6C, where the data storage 604 is not within ready access by a local operator at the production data site 601, the DR testing request may be sent to both the metadata center 603 and the data storage facility 605. During DR testing, an operator at the data storage facility may perform the task of loading or mounting tapes, based on requests and prompts from the cloud storage manager 618, while the local operator at the production data site 601 may be able to monitor the progress of DR testing via his local operator console 610. It will be appreciated that this streamlining of DR testing does not require highly trained personnel to be present either at the data storage facility 605 or the production data site 601.

Alternatively, DR testing from the metadata center 603 may be performed in an abbreviated manner, without having to actually restore backup data. For example, during DR testing, an operator at the data storage facility 605 may be prompted from the cloud storage manager 618 to indicate whether or not directories and files for which DR testing is performed are physically present on media (tapes, disks, etc.) stored at the data storage facility 605 by entering operator feedback on a console at the data storage facility. At the end of the abbreviated DR testing, the cloud storage manager 618 may generate a report indicating whether or not all files and directories whose availability for restoration was tested are in fact available at the data storage facility 605 or not.

As discussed herein, the Operational Support System (OSS) 622 at the metadata center 603 may receive reports of customer usage of the data restoration or DR testing operations performed for various customers and assemble information useful in producing bills to the customers.

The use of optional organization firewall 612 and the metadata center firewall 624, along with other secure data communications techniques such as VPN, can enhance secure data communication between the metadata center 603 and customer production data sites 601. For example, in some implementations, metadata center may receive metadata over a secure hypertext transport protocol (HTTP) link, with each HTTP message comprising metadata in a tabular format. Optionally, the tables for the files being backed up may be generated at the metadata center 603. In other implementations, the local storage manager 608 may be provided access to the metadata center 603 over VPN connection.

Figure 7:
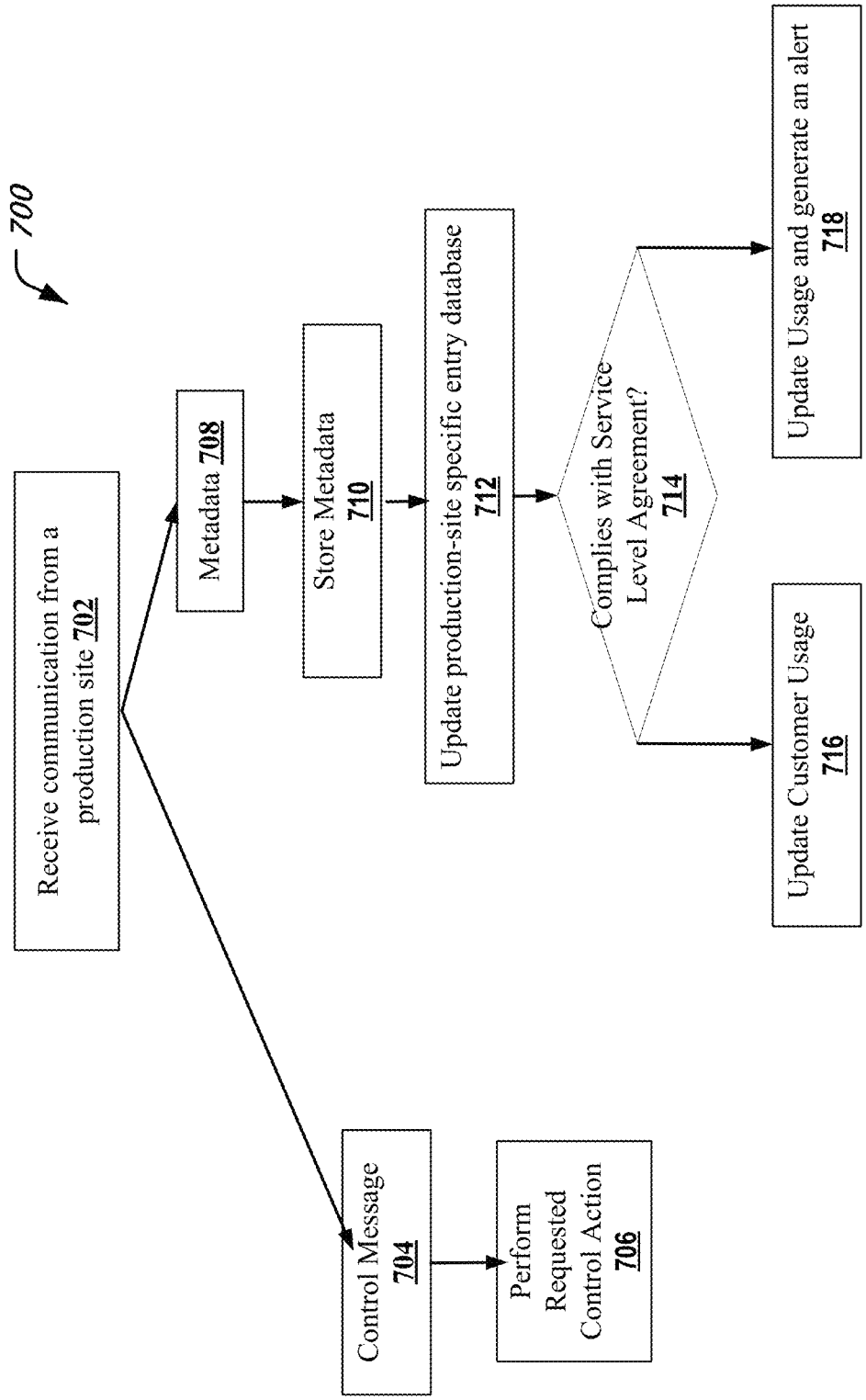
FIG. 7 is a flowchart representation of a process of operating a cloud-based backup storage service.

FIG. 7 is a flowchart representation of a process 700 of operating a cloud-based backup storage service. At 702, a communication may be received from the production site. The communication may be a control message 704 or may carry metadata 708. At 706, when the communication is a control message, the requested action may be performed. At 710, when the received communication is metadata, the metadata is stored to the appropriate data storage location. At 712, upon successful storage of the metadata, a production-site-specific entry in a customer database may be updated. Such a database helps to identify and manage data among multiple customers, and the database may take the form of any data structure. At 714, a check may be made to verify whether the metadata stored at 710 complies with the service level agreement (SLA) for the production site that transmitted the metadata. The short data may be stored in the customer database. At 716, when the stored metadata complies with SLA, the customer usage may be updated to reflect the recently stored metadata. At 718, when the stored metadata exceeds the SLA, the customer usage is updated and an alert is generated indicating that the customer production site is exceeding the SLA.

The use of SLAs and incorporation of SLA information into the operation of metadata center 603 opens up a variety of service level possibilities. For example, one SLA may specify a time window during which metadata is stored at the metadata center 603 (e.g., last 1 month or last 3 years, or last 5 backup operations). Another SLA may specify volume of metadata that may be agreed upon for storage (e.g., 100 Gbytes metadata total or per backup, and so on). Another SLA may be based on not the volume of metadata but the volume of underlying production data that is being backed up at the production data site 601. Furthermore, SLAs may be put in place to specify "warm" time for a cloud storage manager 618 (e.g., cloud storage manager to come online within 2 minutes from the request).

In one beneficial aspect, a metadata service provider may not have to maintain tapes, optical readers, or other types of hardware required to maintain regular backups (non-production data). In another beneficial aspect (further described below) the metadata service provider may be able to spread their capital and operational expenditure over multiple customers being serviced by the metadata center 603.

Figure 8:
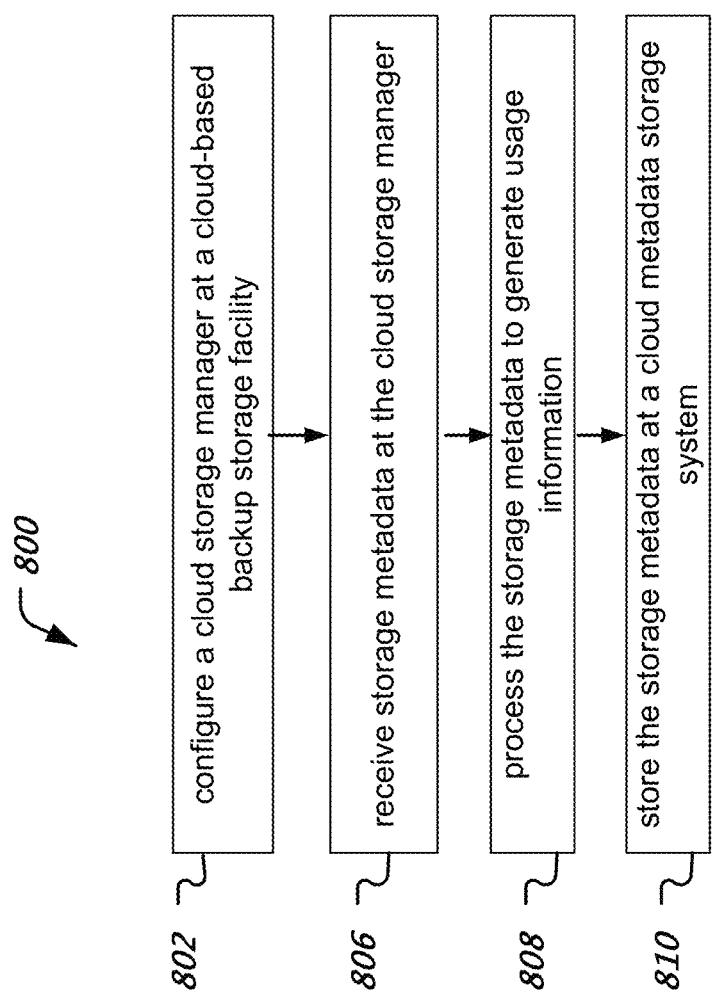
FIG. 8 is a flowchart representation of a process of controlling a cloud based data recovery service from a local monitoring station at a production site.

FIG. 8 is a flowchart representation of a process 800 of providing on implementing a cloud based data recovery service to users of a computer network at a production facility. The process 800 may be implemented by a service provider or a business organization who wishes to provide the functionality desired herein.

At 802, a cloud storage manager is configured at a cloud-based backup storage facility to communicatively couple to a local storage manager at the production data facility. The data storage facility may be communicatively coupled to a gateway server. As previously discussed, the computer network at the production data facility includes the gateway server but not the cloud storage manager. For example, the cloud storage manager and the computer network at the production facility may be in different IP subnetworks or logical/network address spaces. In some implementations, the computer network and the cloud storage manager may be on different sides of intervening one or more firewalls (e.g., the above-discussed organization firewall or the metadata center firewall).

In some implementations, the local storage manager is located at the production facility. In some implementations, the local storage manager is configured to control a backup operation of data in the computer network and communicate storage metadata generated during the backup operation to the cloud storage manager.

At 806, without receiving actual data backed up during the backup operation, the storage metadata is received at the cloud storage manager.

At 808, the storage metadata is processed to generate usage information. As previously discussed the metadata processing may include checking whether the storage metadata complies with a service level agreement with the production facility, and when the storage metadata exceed the service level agreement, then generating an alert message. The alert message may be communicated to an OSS that is configured to generate billing information based on the alert message.

At 810, the storage metadata is stored at a cloud metadata storage system.

In some implementations, the process 800 further includes providing GUI features at the local storage manager. The GUI features may indicate to a local operator whether the local storage manager is operating in a local mode or a remote mode. As previously described, in the local mode, the local storage manager can control data storage and recovery operations. In the remote mode of operation, the data storage and restoration operations may be performed by the remote metadata center and therefore the local storage manager is able to view, but not control, data storage and recovery operations. In various embodiments, the GUI element may be a red/green button that lights up to indicate the operational mode, a textual message or may gray out certain control windows, indicating that the local operator cannot interact with the controls. Other possible GUI arrangements are also possible.

In some implementations, in addition to the routine data storage/recovery tasks, the process 800 may also include DR testing. A DR testing request may be received from a local operator console in the computer network at the production facility. In response to the DR test request, metadata previously stored in the cloud metadata storage request and DR recovery testing is staged using the retrieved metadata. As previously described, the staging can be performed under the control of the cloud storage manager or the local storage manager at the production facility.

Figure 9:
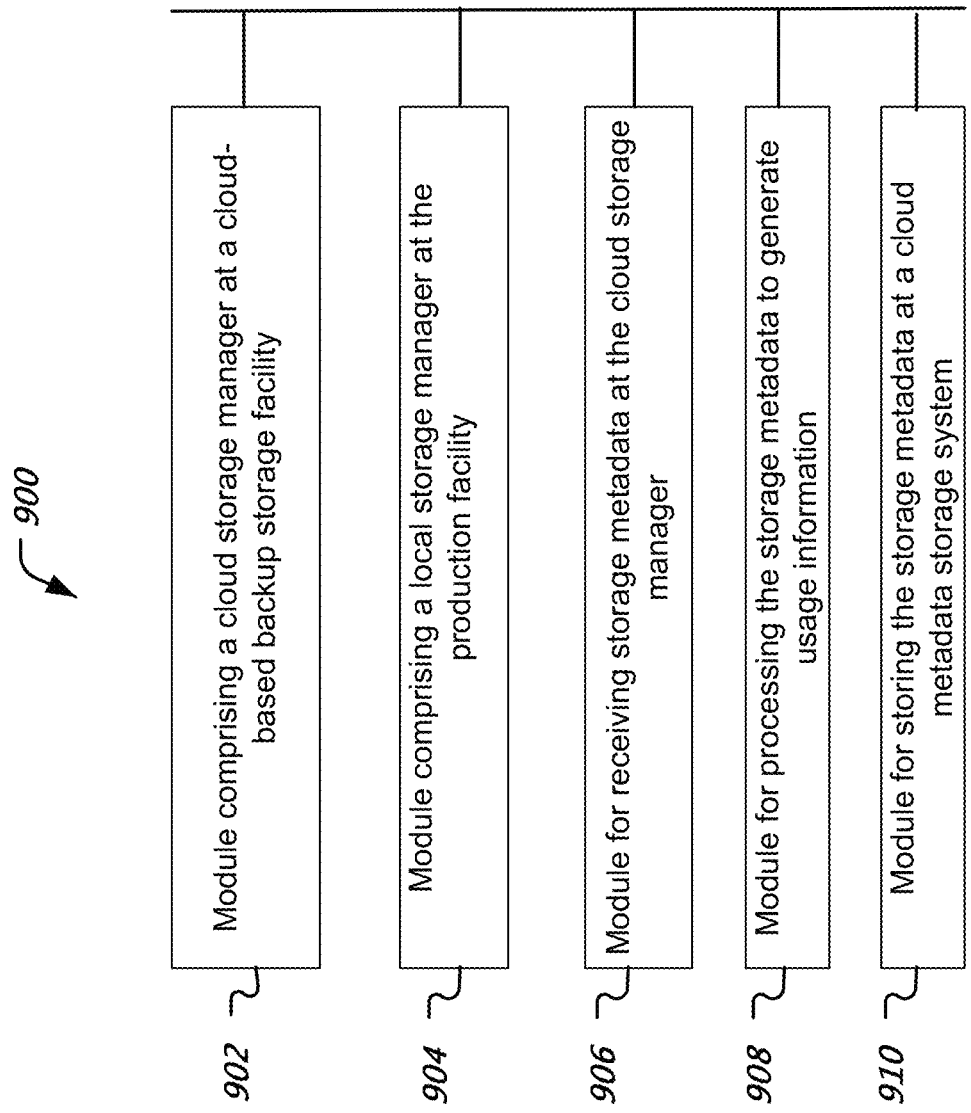
FIG. 9 is a block diagram representation of a local monitoring station for controlling a cloud based data recovery service from at a production site.

FIG. 9 is a block diagram representation of an apparatus 900 for cloud-based data recovery. The module 902 is includes, at a cloud based backup storage facility, a cloud storage manager communicatively coupled to a gateway server. As previously discussed, the computer network includes the gateway server but not the cloud storage manager. The module 904 includes a local storage manager at the production facility, wherein the local storage manager is configured to control a backup operation of data in the computer network and communicate storage metadata generated during the backup operation to the cloud storage manager. The module 906 is for receiving the storage metadata at the cloud storage manager, without receiving actual data backed up during the backup operation, and the module 908 is for processing the storage metadata to generate usage information. The module 910 is for storing the storage metadata at a cloud metadata storage system.

Figure 10:
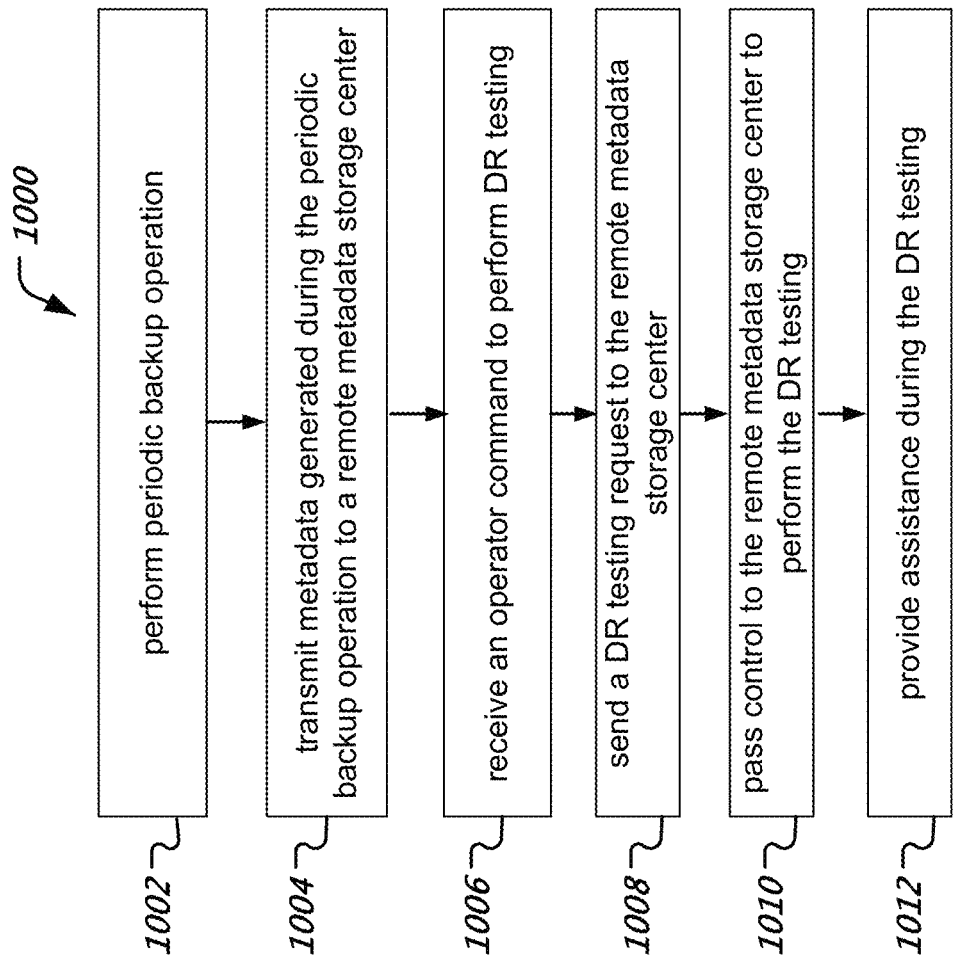
FIG. 10 is a flowchart representation of a process for DR testing using a cloud-based metadata storage facility.

FIG. 10 is a flowchart representation of a process 1000 of controlling a cloud based data recovery service from a local monitoring station at a production site.

At 1002, a periodic scheduled or on-demand backup operation is performed to back up production data from multiple computers communicatively coupled to the local computer network at a production facility.

At 1004, metadata generated during the periodic backup operation is transmitted to a remote metadata storage center without necessarily transmitting the backed up production data itself. As previously discussed, this split between metadata and actual production data provides a considerable savings (a factor of 100 to 1000) in the bandwidth used for transferring the metadata.

At 1006, an operator command is received at a local administration server at a local computer network. The operator commands indicates that the operator wishes to perform DR testing on the backed up production data that was backed up previously. The command may optionally identify a specific time for the backup operation or a set of data files that the DR testing is to be performed on. For example, the command may request data to be recovered at a specific point in time (Nov. 29, 2012) for data files for a particular group (Accounting Dept.).

At 1008, in response to the operator command, a DR testing request is sent to the remote metadata storage center. The request can include qualifiers, such as time, data classifications, etc. Further details on data classification can be found in the assignee's U.S. Pat. No. 7,937,393, entitled Systems and Methods for Classifying and Transferring Information in a Storage Network.

At 1010, control is passed to the remote metadata storage center to perform the DR testing.

At 1012, assistance is provided to the DR testing facility during the DR testing, based on the requests received from the remote metadata storage center.

Figure 11:
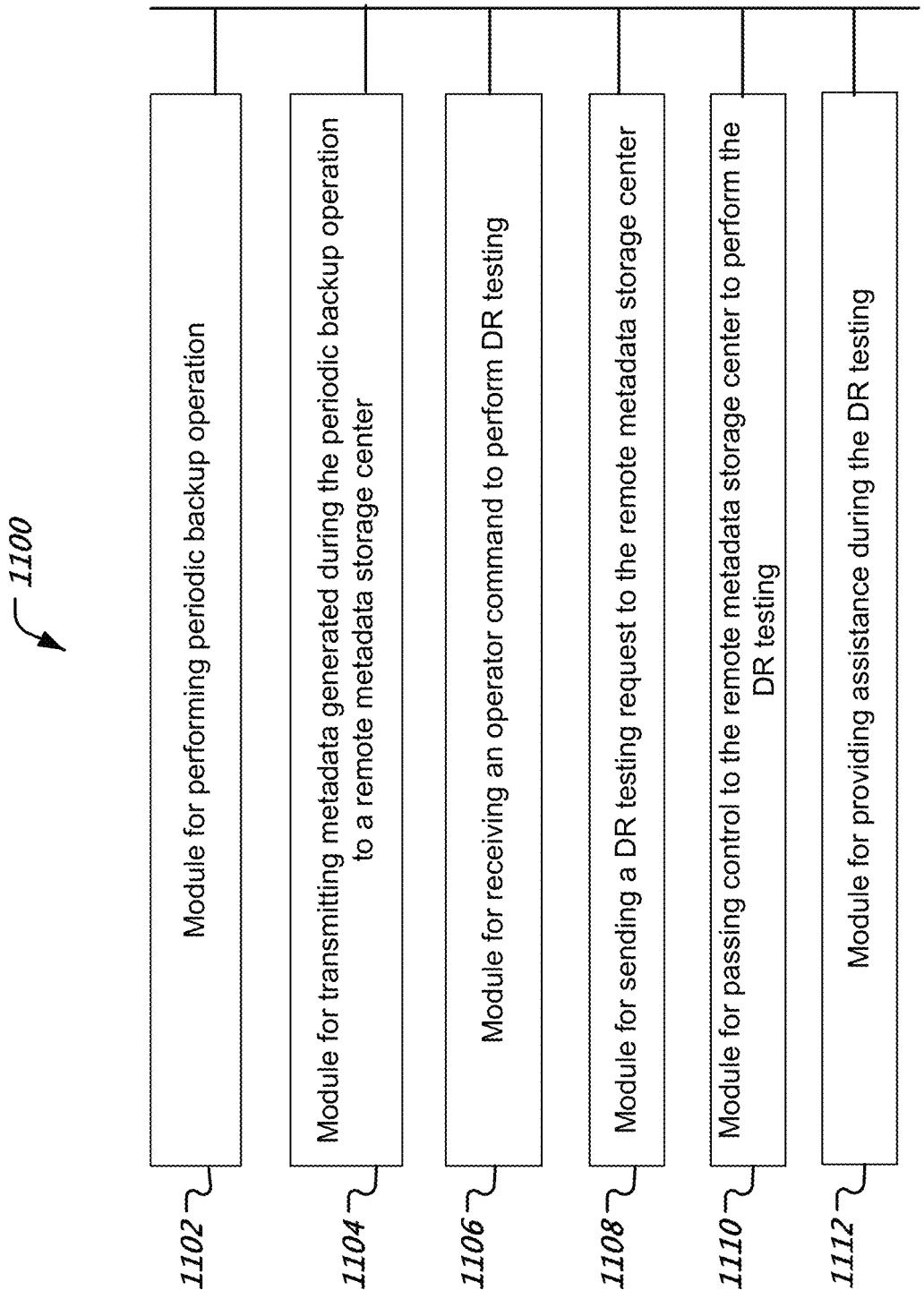
FIG. 11 is a block diagram representation of an apparatus for DR testing using a cloud-based metadata storage facility.

FIG. 11 is a block diagram representation of an apparatus 1100 for facilitating data backup and DR testing at a production facility. The module 1102 is for performing backup operations to copy production data from multiple computers communicatively coupled to the local computer network. The module 1104 is for transmitting metadata generated during the backup operation, without transmitting the backed up production data, to a remote metadata storage center. The module 1106 is for receiving an operator command at a local administration server at the local computer network, to perform DR testing on the backed up production data. The module 1108 is for sending a DR testing request to the remote metadata storage center. The module 1110 is for passing control to the remote metadata storage center to perform the DR testing. The module 1112 is for providing assistance, during the DR testing to the DR testing based on requests received from the remote metadata storage center.

Figure 12:
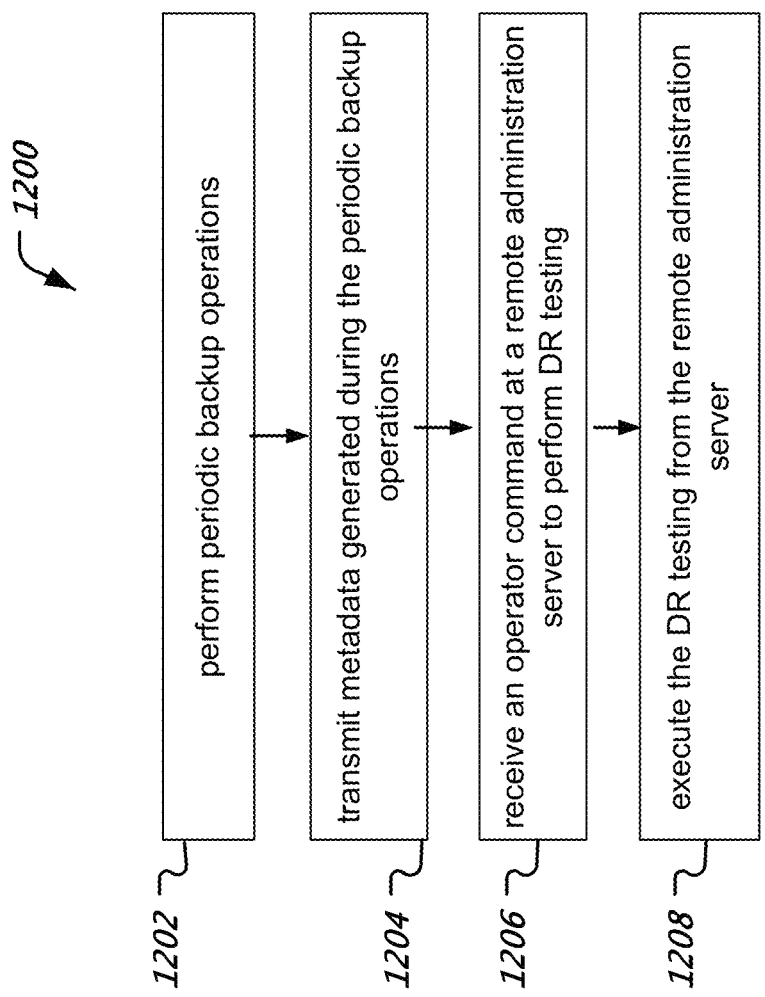
FIG. 12 is a flowchart representation of a cloud based data recovery process performed from a local operator console.

FIG. 12 is a flowchart representation of a process 1200 of performing DR testing on backup data. The process 1200 may be implemented, e.g., at a computer in the remote metadata storage center.

At 1202, the process performs or initiates backups to copy or back up production data from multiple computers communicatively coupled to the local computer network. In some embodiments, an operator at the remote metadata storage center can remotely log into a computer connected at the local computer network to direct the data backup operation.

At 1204, the process transmits or initiates transmission of metadata generated during the backup operation to the remote metadata storage center, without transmitting the actual backed up production data.

At 1206, the process receives an operator command at a remote administration server, instructing to perform DR testing on the backed up production.

At 1208, in response to the instruction, the process performs or initiates DR testing via the remote administration server. The DR testing uses the metadata previously received for staging during the DR testing. The DR testing may be performed without control from a local computer. In some implementations, assistance of a local operator in the production facility may be requested for loading the tape(s) on which the corresponding backed up production data is stored. In some implementations, DR testing may simply be performed by populating the directory structure from the stored metadata, without actually reading back the stored production data.

Figure 13:
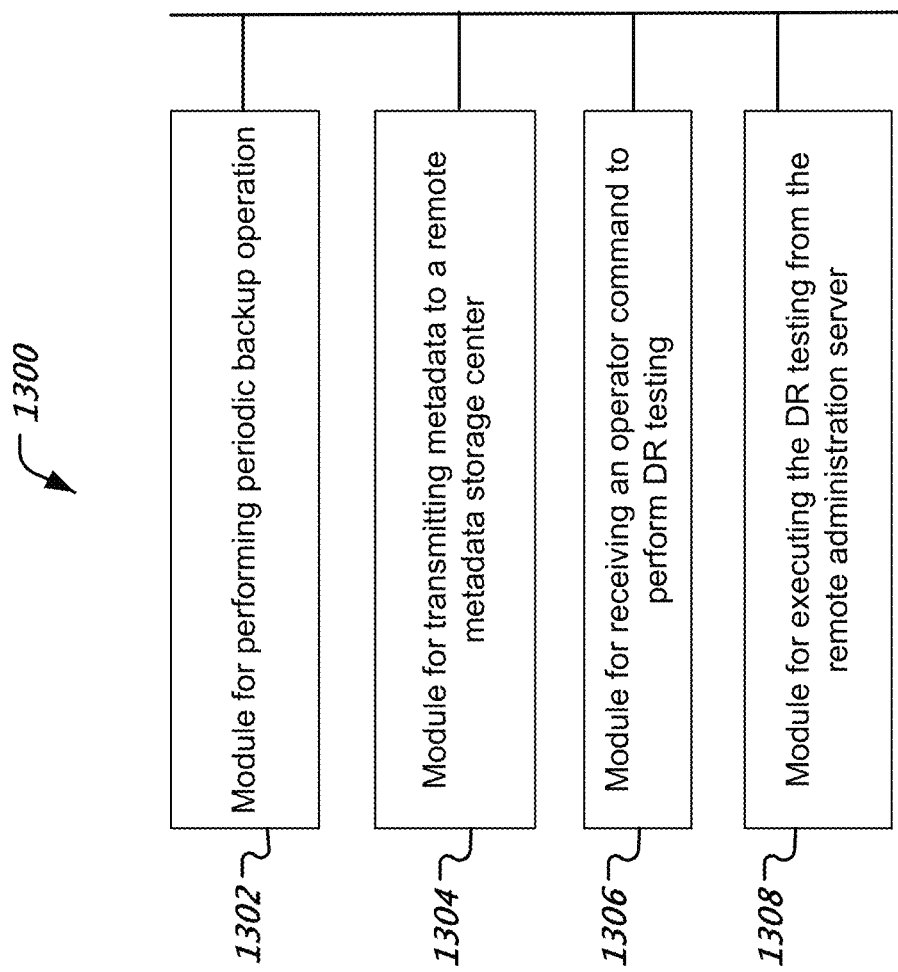
FIG. 13 is a block diagram representation of an apparatus for data recovery and data testing using a cloud based metadata storage manager.

FIG. 13 is a block diagram representation of an apparatus for performing DR testing from a remote site. The module 1302 is for performing or initiating backup operation to back up production data from a plurality of computers communicatively coupled to the local computer network.

The module 1304 is for transmitting metadata generated during the backup operation, without transmitting the backed up production data, to a remote metadata storage center.

The module 1306 is for receiving an operator command at a remote administration server at the remote data center, to perform DR testing on the backed up production data.

The module 1308 is for executing the DR testing from the remote administration server, using the metadata, without control from a computer at the local computer network.

Figure 14:
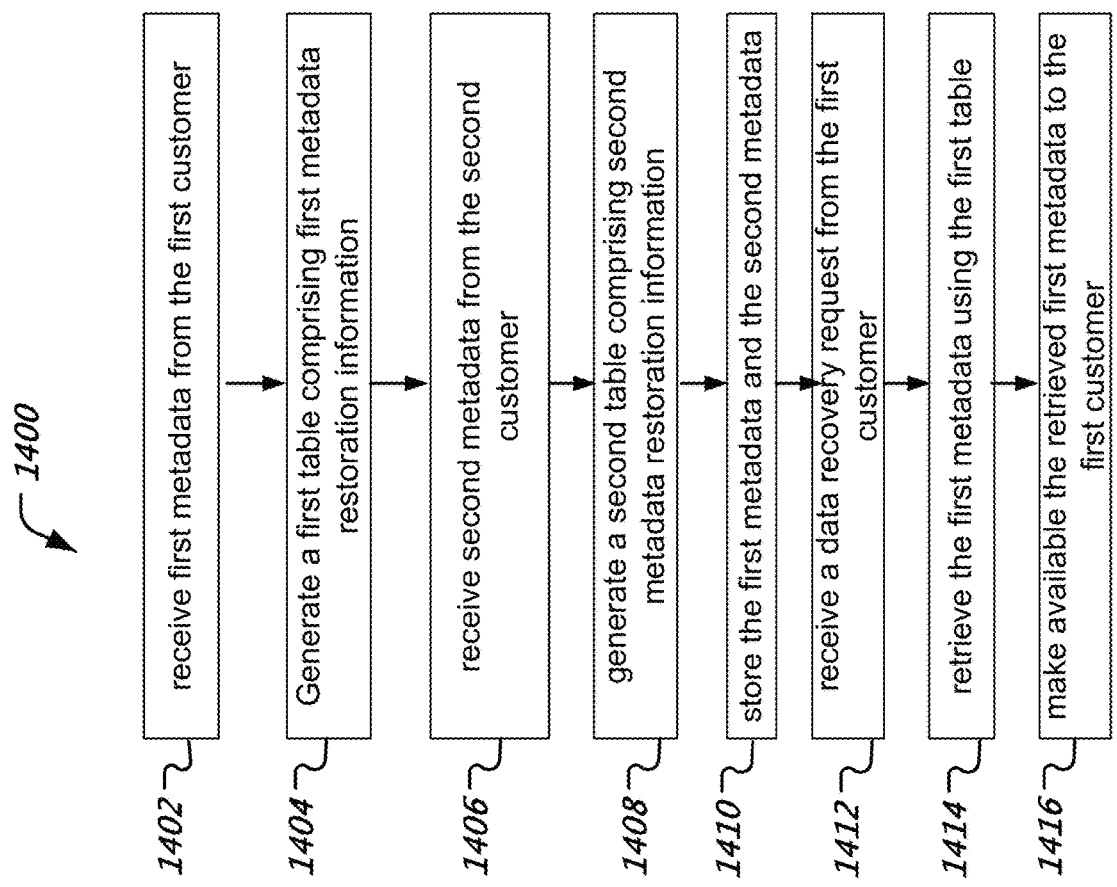
FIG. 14 is a flowchart representation of process of offering metadata storage services to multiple customers.

FIG. 14 is a flowchart representation of a process 1400 of managing metadata for a first customer having a first production data site and a first data storage facility and a second customer, different from the first customer, having a second production data site and a second data storage facility. In general, the data storage facilities may be remotely located from each other.

At 1402, the process receives a first set of metadata from the first customer. As previously discussed, the first metadata may be generated as a result of a first data backup operation in which a first backup data is stored at the first data storage facility.

At 1404, the process generates a first table comprising first metadata restoration information based on the received first metadata. In some embodiments, the table generation may include receiving the first metadata in the HTTP format, stripping out HTTP headers, reassembling the metadata, extracting headers in the metadata, building a table structure that includes a file directory structure, a file listing including file names and attributes associated with the files (size, last modified, user name, last saved, last printed, file type, etc.), adding optional information identifying the particular backup for which the metadata was received (e.g., backup time or a unique backup number) and optionally including data classification information noted above and/or pointers to locations where the metadata is stored on the storage at the metadata center.

At 1406, the process receives a second set of metadata is received from the second customer, the second metadata being generated as a result of a second data backup operation in which a second backup data is stored at the second data storage facility.

At 1408, based on the received second metadata, the process generates a second table comprising second metadata restoration information. In some embodiments, the generation process described with respect to 1404 may be used.

At 1410, the process stores the first metadata and the second metadata in their respective secure data locations. The stored data may be stored locally at the metadata center. In general, the security technique used for each customer may be customizable to the desire and SLA of the customer. For example, one customer may want to use password/username based authentication for access to their metadata, while another customer may use digital certificate based authentication for access to the metadata. Other data security techniques can also be similarly mixed and matched.

At 1412, the process receives a data recovery request from the first customer. As previously discussed, the data recovery request or a DR testing request may be received over a secure web connection or may be received as an e-mail or a phone call or some other means of communication from the first customer.

At 1414, the process retrieves the first metadata using the first table. If the first table includes the optional pointers to locations, these pointers are used to retrieve the metadata. Otherwise, stored metadata is retrieved and the file system listed in the tables is decompressed or rehydrated with the files (without the files actually including the user data) and the integrity of the reconstructed file system is verified.

At 1416, the process makes the retrieved first metadata available to the first customer. In some embodiments, due to secure isolation between the customers, when the first metadata is made available to the first customer, there is no impact on service offered to the second customer or the second customer is not even made aware of the metadata availability to the first customer.

It will be appreciated that the system and processes described herein provide techniques that reduce complexity and improve serviceability of data backup/restore and DR testing operations. These techniques improve data recovery and disaster recovery (DR) testing for computer networks. In some disclosed embodiments, serviceability aspect of data backup/recovery operations and DR testing is improved. In one aspect, the disclosed techniques provide a DR testing service in the cloud. The DR testing service may allow a business to perform data recovery or DR testing without having to take on complex and time consuming tasks of performing data restoration and maintaining trained personnel at the business site or at an off-site data center.

It will further be appreciated that techniques are disclosed for a backup data service provider to provide technology services to multiple entities (e.g., business organizations or customer premises). The bandwidth used on the link between the service provider and the business may be significantly lower than the volume of data for which backup service is provided. The service provider may make available a storage management server that the business can access, either using an online tool such as a secure login over the Internet, or using an offline tool, such as by placing a phone call. The service provider may hold metadata for each of its customers in a secure container such that only authorized administrators and the business customer are authorized to access the metadata. In any case, because the metadata itself does not include user generated files, an extra level of data security is offered to customers because, even when there metadata were compromised, actual data is not harmed or accessed.

It will further be appreciated that the described techniques make it easy for a growing business to sign up for data backup and DR testing services, without having to face the problem of running out of space. Because the storage manager is maintained by the service provider at a remote site, businesses can now sign up for DR testing services without having to purchase additional hardware platform to run the storage manager, or have to train personnel to perform data restoration and DR testing operations. In one aspect, a service provider may alert each business when the business's backup data exceeds a service level agreement.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. A system for performing disaster recovery (DR) testing on backup data stored in a local computer network, wherein the system comprises a non-transitory computer-readable medium having instructions stored thereon, which when executed by one or more hardware processors of the system cause the system to:
perform backup operations to copy production data from multiple computers communicatively coupled to the local computer network, resulting in backup data;
transmit storage metadata generated during the backup operations, without transmitting the backup data, to a metadata center at a geographical location that is remote from a geographical location of the local computer network,
wherein the storage metadata includes one or more of: pointers, lookup tables, and any combination thereof created during the backup operations, and
wherein the metadata center stores metadata associated with the production data from the multiple computers, wherein the metadata includes the storage metadata created during the backup operations;
receive an operator command, at a local administration server at the local computer network, to perform DR testing on the backup data;
send a DR testing request to the metadata center; and
pass control to the metadata center to perform the DR testing at the metadata center using the storage metadata.

2. The system of claim 1, wherein the instructions when executed by the one or more hardware processors of the system further cause the system to:
operate a graphical user interface (GUI) at the local administration server, wherein the GUI displays status updates of the DR testing received from the metadata center.

3. The system of claim 2, wherein the instructions when executed by the one or more hardware processors of the system further cause the system to:
receive service alert messages from the metadata center, wherein the service alert messages indicate that a service level agreement has been exceeded; and
provide the service alert messages on the GUI.

4. The system of claim 2, wherein the instructions when executed by the one or more hardware processors of the system further cause the system to:
receive a restoration request from the metadata center for one or more data files;
verify availability of the one or more data files within the backup data, wherein the backup data is stored on data storage coupled to the local computer network; and
communicate on the availability to the metadata center.

5. The system of claim 1, wherein the instructions when executed by the one or more hardware processors of the system further cause the system to:
process, at the metadata center, the storage metadata to generate usage information.

6. The system of claim 5, wherein processing the storage metadata to generate usage information includes:
checking the storage metadata to determine whether the storage metadata complies with at least one service level agreement, and when the storage metadata exceeds the at least one service level agreement, then generating an alert message; and
communicating the alert message to an operations support system that is configured to generate billing information based on the alert message.

7. The system of claim 1, wherein the instructions when executed by the one or more hardware processors of the system further cause the system to:
check the storage metadata to determine whether the storage metadata complies with at least one service level agreement, and
when the storage metadata exceeds the at least one service level agreement, then generate an alert message.

8. The system of claim 1, wherein the metadata center is at a cloud-based metadata storage facility.

9. The system of claim 1, wherein the metadata center is cloud-based, and wherein an administration server that operates at the metadata center performs the DR testing.

10. The system of claim 1, wherein the metadata center is cloud-based, and wherein the DR testing restores one or more data files, using the storage metadata, from the local computer network to a cloud-based computer that is outside the local computer network and is distinct from the multiple computers communicatively coupled to the local computer network.

11. A computer-implemented method of performing disaster recovery (DR) testing on backup data stored in a first computer network, comprising:
performing one of: a periodic backup operation, a scheduled backup operation, and an on-demand backup operation to copy production data from a plurality of computers communicatively coupled to the first computer network, wherein the backup operation generates backup data;
transmitting storage metadata generated during the backup operation, without transmitting the backup data, to a metadata center at a geographical location that is remote from a geographical location of the first computer network,
wherein the storage metadata is transmitted over a second computer network, and
wherein the storage metadata includes one or more of: pointers, lookup tables, and any combination thereof, created during the backup operation, which are utilized when restoring the backup data to a user machine of the first computer network;
receiving an operator command, at a remote administration server at the metadata center, to perform DR testing on the backup data; and
executing the DR testing via the remote administration server, using the storage metadata, without control from a computer coupled to the first computer network.

12. The method of claim 11, further comprising:
operating a graphical user interface (GUI) at an administration server in the first computer network, wherein the GUI displays status updates of the DR testing received from the metadata center.

13. The method of claim 12, further comprising:
receiving at least one service alert message from the metadata center, wherein the at least one service alert message indicates that a service level agreement has been exceeded; and
providing the at least one service alert message on the GUI.

14. The method of claim 13, further comprising:
receiving a restoration request for one or more data files from the metadata center;
verifying availability of the one or more data files within the backup data, wherein the backup data is stored on data storage coupled to the first computer network; and
communicating a result of the verifying to the metadata center.

15. The method of claim 11, further comprising:
processing, at the metadata center, the storage metadata to generate usage information.

16. The method of claim 15, wherein the processing of the storage metadata to generate usage information includes:
determining whether the storage metadata complies with at least one service level agreement, and when the storage metadata exceeds the at least one service level agreement, then generating an alert message; and
communicating the alert message to an operations support system that is configured to generate billing information based on the alert message.

17. The method of claim 11, further comprising:
determining whether the storage metadata complies with at least one service level agreement, and when the storage metadata exceeds the at least one service level agreement, then generating an alert message.

18. The method of claim 11, wherein the metadata center is at a cloud-based metadata storage facility.

19. The method of claim 11, wherein the remote administration server at the metadata center performs the DR testing, and wherein the metadata center is cloud-based.

20. The method of claim 11, wherein the metadata center is cloud-based, and wherein the DR testing, using the storage metadata, restores one or more data files from the backup data stored in the first computer network to a cloud-based computer that is outside the first computer network and is distinct from the plurality of computers communicatively coupled to the first computer network.

* * * * *